(12) United States Patent
Kawakami

(10) Patent No.: US 9,919,760 B2
(45) Date of Patent: Mar. 20, 2018

(54) BICYCLE OPERATING DEVICE

(71) Applicant: SHIMANO INC., Sakai (JP)

(72) Inventor: Tatsuya Kawakami, Sakai (JP)

(73) Assignee: SHIMANO INC., Sakai (JP)

( * ) Notice: Subject to any disclaimer, the term of this patent is extended or adjusted under 35 U.S.C. 154(b) by 305 days.

(21) Appl. No.: 14/207,499

(22) Filed: Mar. 12, 2014

(65) Prior Publication Data

US 2015/0259024 A1 Sep. 17, 2015

(51) Int. Cl.
| | | |
|---|---|---|
| *B62K 23/06* | (2006.01) | |
| *F16D 41/02* | (2006.01) | |
| *F16D 41/30* | (2006.01) | |
| *B62M 25/04* | (2006.01) | |
| *F16D 41/12* | (2006.01) | |
| *F16D 23/12* | (2006.01) | |

(52) U.S. Cl.
CPC ............ *B62K 23/06* (2013.01); *B62M 25/04* (2013.01); *F16D 41/02* (2013.01); *F16D 41/30* (2013.01); *F16D 23/12* (2013.01); *F16D 41/12* (2013.01); *Y10T 74/20438* (2015.01)

(58) Field of Classification Search
CPC .... B62M 25/04; B62M 25/02; B62M 25/045; B62K 23/06; B62K 23/04; F16D 41/30; F16D 41/02; Y10T 74/20438; Y10T 74/20402; Y10T 74/2042; B60T 7/102; B60T 11/046; G05G 1/04
See application file for complete search history.

(56) References Cited

U.S. PATENT DOCUMENTS

| | | | | |
|---|---|---|---|---|
| 5,241,878 A | * | 9/1993 | Nagano | B62K 23/06 192/217 |
| 5,355,745 A | * | 10/1994 | Wu | B62M 25/04 74/489 |
| 5,676,022 A | * | 10/1997 | Ose | B62K 23/06 74/489 |
| 5,832,782 A | * | 11/1998 | Kawakami | B62K 23/06 116/28.1 |
| 5,957,002 A | * | 9/1999 | Ueng | B62K 23/06 74/142 |
| 6,691,591 B2 | * | 2/2004 | Tsumiyama | B62K 23/04 74/489 |
| 2006/0070484 A1 | | 4/2006 | Kawakami | |
| 2006/0207375 A1 | * | 9/2006 | Jordan | B62M 25/04 74/489 |
| 2007/0068316 A1 | * | 3/2007 | Kawakami | B62M 25/04 74/502.2 |

(Continued)

FOREIGN PATENT DOCUMENTS

| | | |
|---|---|---|
| CN | 201380944 Y | 1/2010 |
| DE | 60 2005 005 406 T2 | 3/2009 |

*Primary Examiner* — Daniel D Yabut
(74) *Attorney, Agent, or Firm* — Mori & Ward, LLP

(57) ABSTRACT

A bicycle operating device comprises a base member, an operating construction, a wire takeup member, a ratchet member, a first pawl, and an actuating member. The wire takeup member is configured to be rotatable relative to the base member about a rotational axis in a first direction and a second direction. The ratchet member has ratchet teeth. The actuating member includes a second pawl. The actuating member is configured to move the first pawl away from the ratchet member and to engage the second pawl with one of the ratchet teeth, in response to a second operation of the operating construction.

30 Claims, 19 Drawing Sheets

(56) References Cited

U.S. PATENT DOCUMENTS

| | | | | |
|---|---|---|---|---|
| 2008/0196537 A1* | 8/2008 | Dal Pra' | ................ | B62K 23/06 74/502.2 |
| 2009/0031846 A1* | 2/2009 | Dal Pra' | ................ | B62K 23/06 74/502.2 |
| 2009/0314117 A1* | 12/2009 | Kawakami | ............. | B62K 23/06 74/489 |

* cited by examiner

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, an operating construction, a wire takeup member, a ratchet member, a first pawl, and an actuating member. The operating construction is coupled to the base member. The wire takeup member is configured to be rotatable relative to the base member about a rotational axis in a first direction and a second direction opposite to the first direction. The ratchet member has ratchet teeth and is configured to be rotatable with the wire takeup member between a plurality of predetermined positions. The first pawl is configured to engage with one of the ratchet teeth so as to rotate the wire takeup member in the first direction in response to a first operation of the operating construction. The actuating member includes a second pawl. The actuating member is configured to move the first pawl away from the ratchet member and to engage the second pawl with one of the ratchet teeth, in response to a second operation of the operating construction.

In accordance with a second aspect of the present invention, the bicycle operating device according to the first aspect is configured so that the actuating member is configured such that the second pawl moves the first pawl away from the ratchet member and engages with one of the ratchet teeth which is adjacent to the first pawl in the first direction.

In accordance with a third aspect of the present invention, the bicycle operating device according to the second aspect is configured so that the first pawl includes a first contact surface. The second pawl includes a second contact surface configured to slidably contact the first contact surface to move the first pawl away from the ratchet member.

In accordance with a fourth aspect of the present invention, the bicycle operating device according to the first aspect further comprises a third pawl configured to engage with one of the ratchet teeth of the ratchet member to position the ratchet member in one of the plurality of predetermined positions.

In accordance with a fifth aspect of the present invention, the bicycle operating device according to the fourth aspect is configured so that the actuating member is configured to release the third pawl from the ratchet member in response to the second operation.

In accordance with a sixth aspect of the present invention, the bicycle operating device according to the fifth aspect is configured so that the actuating member includes a first part and a second part. The first part is configured to be pivotable relative to the base member about a first actuating axis and including the second pawl. The second part is configured to be pivotable relative to the base member about a second actuating axis. The first actuating axis differs from the second actuating axis.

In accordance with a seventh aspect of the present invention, the bicycle operating device according to the sixth aspect is configured so that the first actuating axis is parallel to the second actuating axis.

In accordance with an eighth aspect of the present invention, the bicycle operating device according to the sixth aspect is configured so that the second part of the actuating member is configured to release the third pawl from the ratchet member in response to the second operation.

In accordance with a ninth aspect of the present invention, the bicycle operating device according to the eighth aspect is configured so that the second part is configured to pivot the first part such that the second pawl moves the first pawl away from the ratchet member and to prevent rotation of the wire takeup member in the second direction.

In accordance with a tenth aspect of the present invention, the bicycle operating device according to the first aspect is configured so that the operating construction includes a first operating member and a second operating member. The first operating member is configured to be movable relative to the base member to provide the first operation. The second operating member is configured to be movable relative to the base member to provide the second operation.

In accordance with an eleventh aspect of the present invention, the bicycle operating device according to the tenth aspect is configured so that the second operating member is pivotable relative to the base member in a first operating direction and a second operating direction opposite to the first operating direction. The second operating member is configured to actuate the actuating member when the second operating member is pivoted in each of the first operating direction and the second operating direction.

In accordance with a twelfth aspect of the present invention, the bicycle operating device according to the eleventh aspect is configured so that the second operating member is configured to be pivotable about a first pivot axis in the first operating direction and about a second pivot axis in the second operating direction. The first pivot axis differs from the second pivot axis.

In accordance with a thirteenth aspect of the present invention, the bicycle operating device according to the twentieth aspect is configured so that the first pivot axis is parallel to the second pivot axis.

In accordance with a fourteenth aspect of the present invention, the bicycle operating device according to the twentieth aspect is configured so that the second pivot axis is coaxial with the rotational axis of the wire takeup member.

In accordance with a fifteenth aspect of the present invention, the bicycle operating device according to the twentieth aspect is configured so that the actuating member is configured to be pivotable relative to the base member about a third pivot axis. The third pivot axis is coaxial with the first pivot axis of the second operating member.

In accordance with a sixteenth aspect of the present invention, the bicycle operating device according to the twentieth aspect is configured so that the first pawl is pivotally provided on the first operating member about a fourth pivot axis. The first operating member is pivotable relative to the base member about the rotational axis of the wire takeup member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
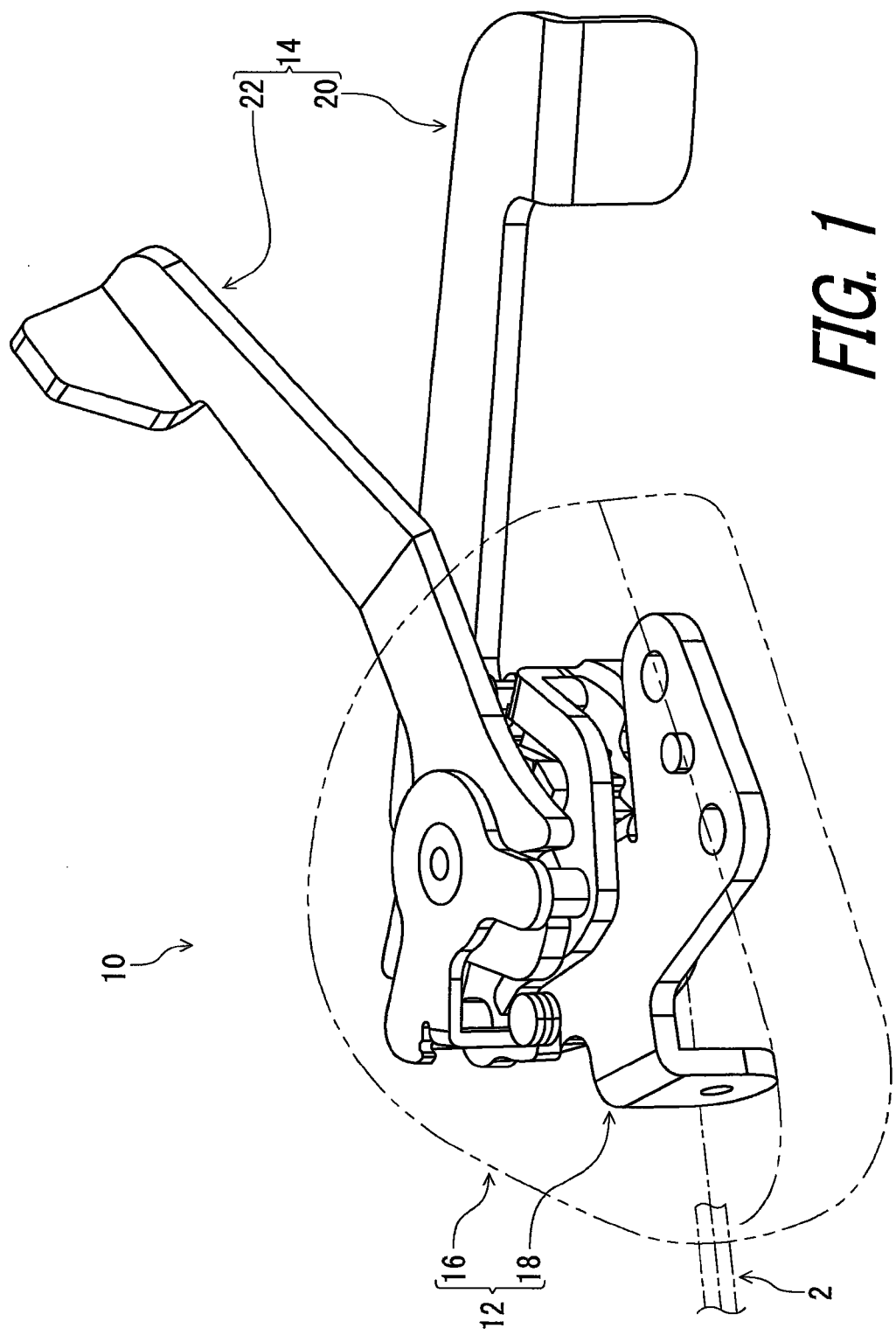
FIG. 1 is a perspective view of a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is illustrated. The bicycle operating device 10 is configured to be attached to a bicycle handlebar (not shown) for operating a bicycle component via a control cable 2. In the illustrated embodiment, the bicycle operating device 10 is configured to operate a bicycle transmission (not shown) such as a derailleur and an internal gear hub. Since such bicycle components are well known in the bicycle field, they will not be described in detail here for the sake of brevity. The bicycle operating device 10 is a right bicycle operating device configured to be operated with a rider's right hand. However, it will be apparent to those skilled in the bicycle field from the present disclosure that the configuration of the bicycle operating device 10 can be applied to a left bicycle operating device.

In the present application, the following directional terms "forward", "rearward", "left", "right", "upward" and "downward" as well as any other similar directional terms refer to those directions which are determined on the basis of a user (e.g., a rider) who sits on a saddle (not shown) of a bicycle with facing the bicycle handlebar (not shown). Accordingly, these terms, as utilized to describe the bicycle operating device 10, should be interpreted relative to a bicycle equipped with the bicycle operating device 10 as used in an upright riding position on a horizontal surface.

As seen in FIG. 1, the bicycle operating device 10 comprises a base member 12 and an operating construction 14. The base member 12 is configured to be mounted to the bicycle handlebar (not shown) via a mounting structure (not shown) such as a clamping structure. Since such mounting structures are well known in the bicycle field, they will not be described in detail here for the sake of brevity. The base member 12 includes a housing 16 and a support structure 18. The support structure 18 is secured to the housing 16 and is provided inside the housing 16.

The operating construction 14 is coupled to the base member 12. More specifically, the operating construction 14 is movably coupled to the base member 12. In the illustrated embodiment, the operating construction 14 includes a first operating member 20 and a second operating member 22. The operating construction 14 can, however, include a single operating member instead of the first operating member 20 and the second operating member 22 if needed and/or desired. The first operating member 20 is pivotably coupled to the support structure 18. The second operating member 22 is pivotably coupled to the support structure 18.

Figure 2:
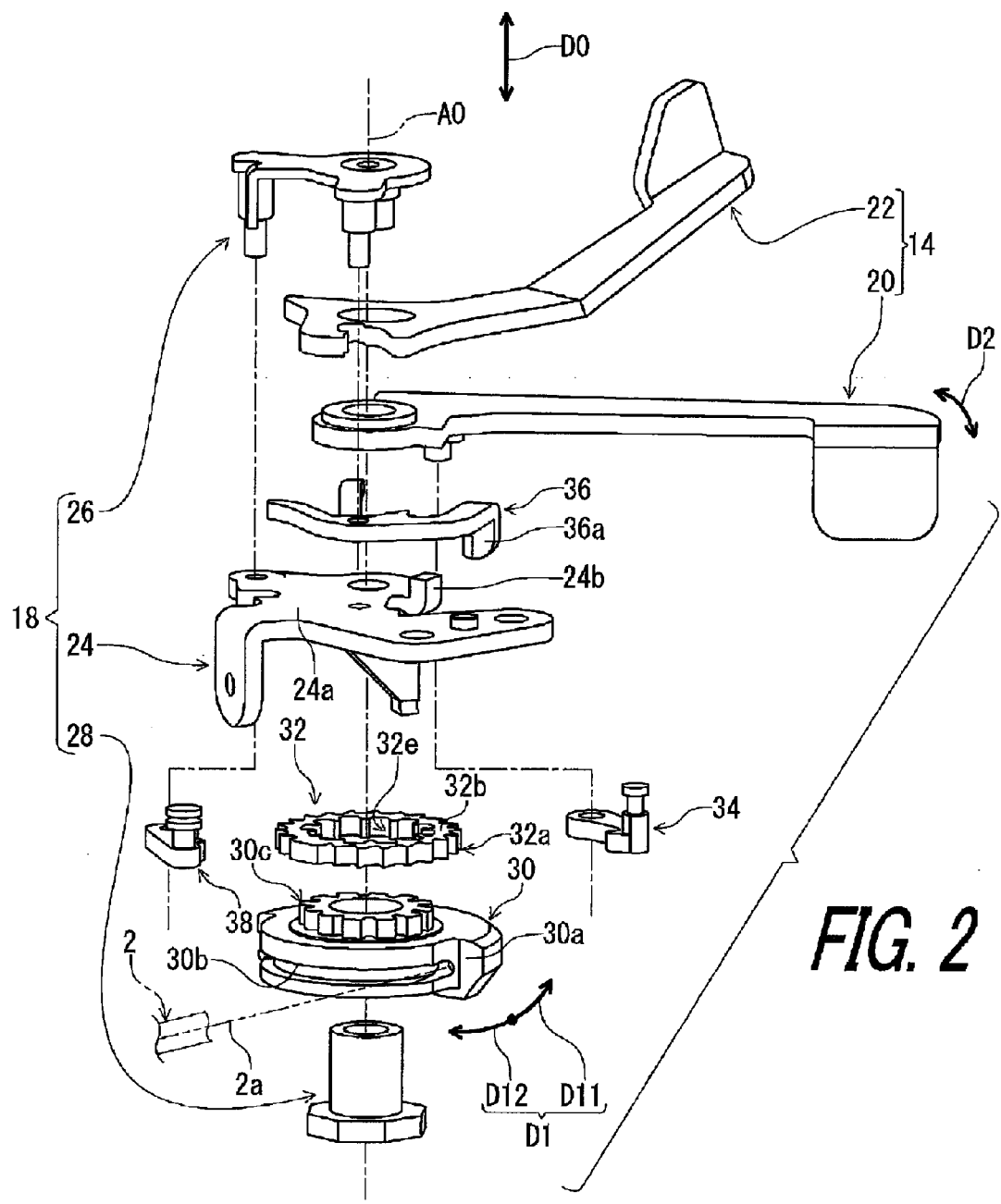
FIG. 2 is an exploded perspective view of a part of the bicycle operating device illustrated in FIG. 1.

As seen in FIG. 2, the support structure 18 includes a base plate 24, a first support member 26 and a second support member 28. The base plate 24, the first support member 26 and the second support member 28 are secured to the housing 16 (FIG. 1) with fasteners (not shown) such as bolts and screws. The first support member 26 pivotably supports the first operating member 20 and the second operating member 22.

The bicycle operating device 10 comprises a wire takeup member 30. The wire takeup member 30 is configured to be rotatable relative to the base member 12 (FIG. 1) about a rotational axis A0 in a first direction D11 and a second direction D12 opposite to the first direction D11. In the illustrated embodiment, the wire takeup member 30 is rotatable relative to the support structure 18 about the rotational axis A0 in a rotational direction D1. The rotational direction D1 includes the first direction D11 and the second direction D12. The second support member 28 rotatably supports the wire takeup member 30 about the rotational axis A0.

The wire takeup member 30 includes a wire attachment portion 30a to which an end of an inner wire 2a of the control cable 2 is to be attached. The wire takeup member 30 includes a guide groove 30b configured to guide the inner wire 2a when the wire takeup member 30 rotates relative to the support structure 18 (i.e., the base member 12) to wind or unwind the inner wire 2a.

As seen in FIG. 2, the bicycle operating device 10 comprises a ratchet member 32. The ratchet member 32 has ratchet teeth 32a and is configured to be rotatable with the wire takeup member 30 between a plurality of predetermined positions. The predetermined positions are defined by the ratchet teeth 32a.

The ratchet member 32 includes an annular body 32b and inner teeth 32e protruding from an inner periphery of the annular body 32b. The ratchet teeth 32a are provided on an outer periphery of the annular body 32b. The wire takeup member 30 includes a spline 30c. The inner teeth 32e are meshed with the spline 30c of the wire takeup member 30 such that the ratchet member 32 is rotatable with the wire takeup member 30 about the rotational axis A0 in the rotational direction D1. In the illustrated embodiment, the ratchet member 32 is a separate member from the wire takeup member 30. The ratchet member 32 can, however, be integrally provided with the wire takeup member 30 as a single unitary member if needed and/or desired.

As seen in FIG. 2, the bicycle operating device 10 comprises a first pawl 34. The first pawl 34 is configured to engage with one of the ratchet teeth 32a so as to rotate the wire takeup member 30 in the first direction D11 in response to a first operation of the operating construction 14. The first operating member 20 is configured to be movable relative to the base member 12 (FIG. 1) to provide the first operation. In the illustrated embodiment, the first operating member 20 is pivotable relative to the base member 12 (FIG. 1) about the rotational axis A0 of the wire takeup member 30 in a pivot direction D2 to provide the first operation.

As seen in FIG. 2, the bicycle operating device 10 comprises an actuating member 36. The actuating member 36 includes a second pawl 36a. The actuating member 36 is configured to move the first pawl 34 away from the ratchet member 32 and to engage the second pawl 36a to engage with one of the ratchet teeth 32a, in response to a second operation of the operating construction 14, so as to prevent rotation of the wire takeup member 30 in the second direction D12. The second operating member 22 is configured to be movable relative to the base member 12 to provide the second operation. In the illustrated embodiment, the second operating member 22 is configured to be pivotable relative to the support structure 18 to provide the second operation.

The bicycle operating device 10 further comprises a third pawl 38 configured to engage with one of the ratchet teeth 32a of the ratchet member 32 to position the ratchet member 32 in one of the plurality of predetermined positions. In the illustrated embodiment, the predetermined positions of the ratchet member 32 are rotational positions in the rotational direction D1.

Figure 3:
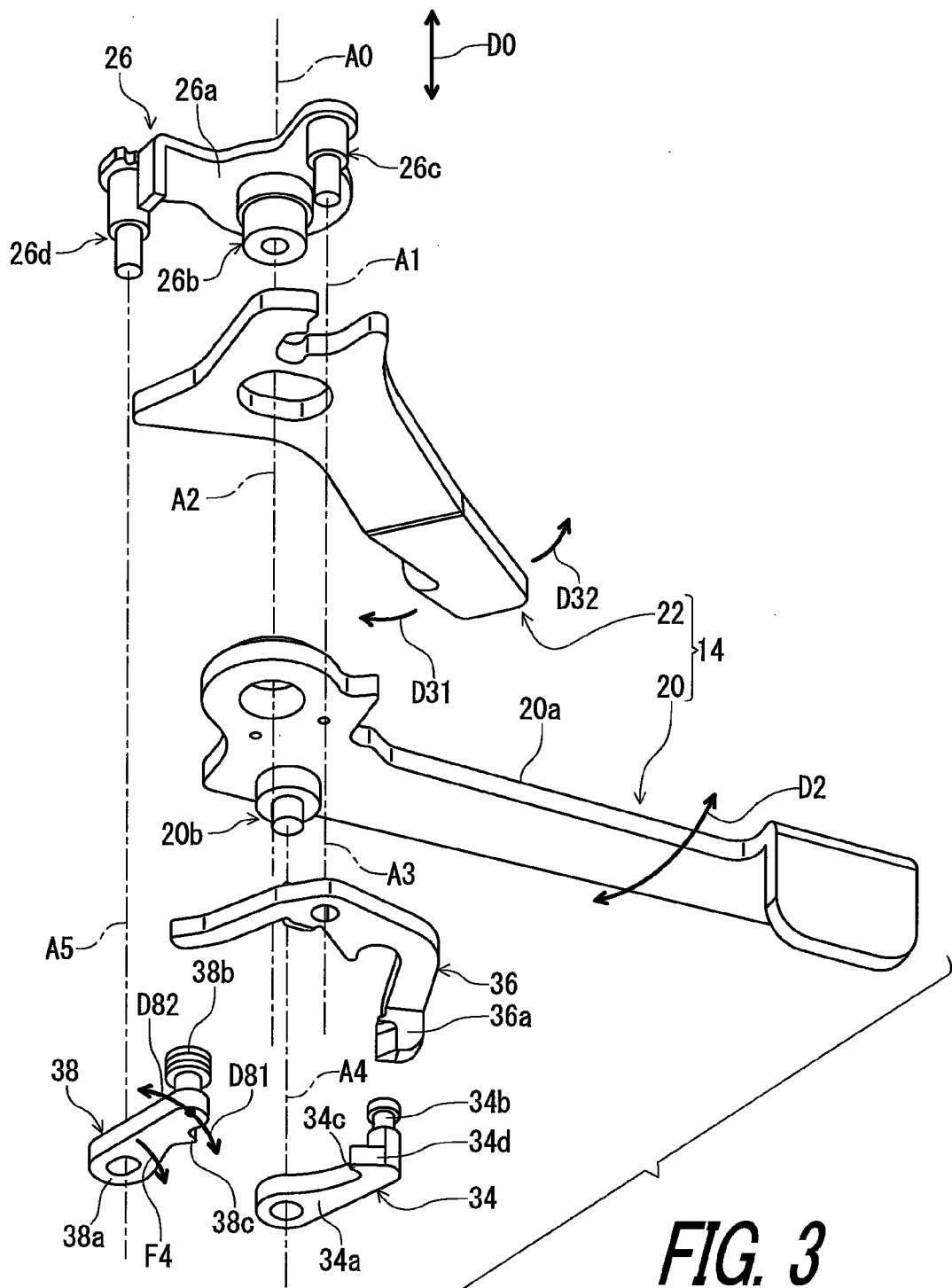
FIG. 3 is an exploded perspective view of a part of the bicycle operating device illustrated in FIG. 1.

As seen in FIG. 3, the second operating member 22 is pivotable relative to the base member 12 (FIG. 1) in a first operating direction D31 and a second operating direction D32 opposite to the first operating direction D31. The second operating member 22 is configured to be pivotable about a first pivot axis A1 in the first operating direction D31 and about a second pivot axis A2 in the second operating direction D32. In the illustrated embodiment, the second operation of the second operating member 22 includes at least one of first pivotal movement of the second operating member 22 in the first operating direction D31 and second pivotal movement of the second operating member 22 in the second operating direction D32. The first pivot axis A1 differs from the second pivot axis A2. The first pivot axis A1 is parallel to the second pivot axis A2. The second pivot axis A2 is coaxial with the rotational axis A0 of the wire takeup member 30 (FIG. 2).

More specifically, the first support member 26 includes a first base portion 26a, a first shaft portion 26b and a second shaft portion 26c. The first shaft portion 26b protrudes from the first base portion 26a in an axial direction D0 corresponding to the rotational axis A0. The first shaft portion 26b pivotably supports the first operating member 20 about the rotational axis A0. The first shaft portion 26b pivotably supports the second operating member 22 about the second pivot axis A2 (i.e., the rotational axis A0).

The actuating member 36 is configured to be pivotable relative to the base member 12 about a third pivot axis A3. The third pivot axis A3 is coaxial with the first pivot axis A1 of the second operating member 22. More specifically, the second shaft portion 26c protrudes from the first base portion 26a in the axial direction D0. The second shaft portion 26c pivotably supports the actuating member 36 about the third pivot axis A3.

As seen in FIG. 3, the first pawl 34 is pivotally provided on the first operating member 20 about a fourth pivot axis A4. The fourth pivot axis A4 is parallel to the rotational axis A0 and the second pivot axis A2. The first operating member 20 includes a first lever plate 20a and a shaft part 20b. The shaft part 20b protrudes from the first lever plate 20a in the axial direction D0. The shaft part 20b pivotably supports the first pawl 34 about the fourth pivot axis A4.

The third pawl 38 is configured to be pivotable relative to the base member 12 about a fifth pivot axis A5. More specifically, the first support member 26 includes a third shaft portion 26d. The third shaft portion 26d protrudes from the first base portion 26a in the axial direction D0. The third shaft portion 26d pivotably supports the third pawl 38 about the fifth pivot axis A5. The fifth pivot axis A5 is parallel to the rotational axis A0.

Figure 4:
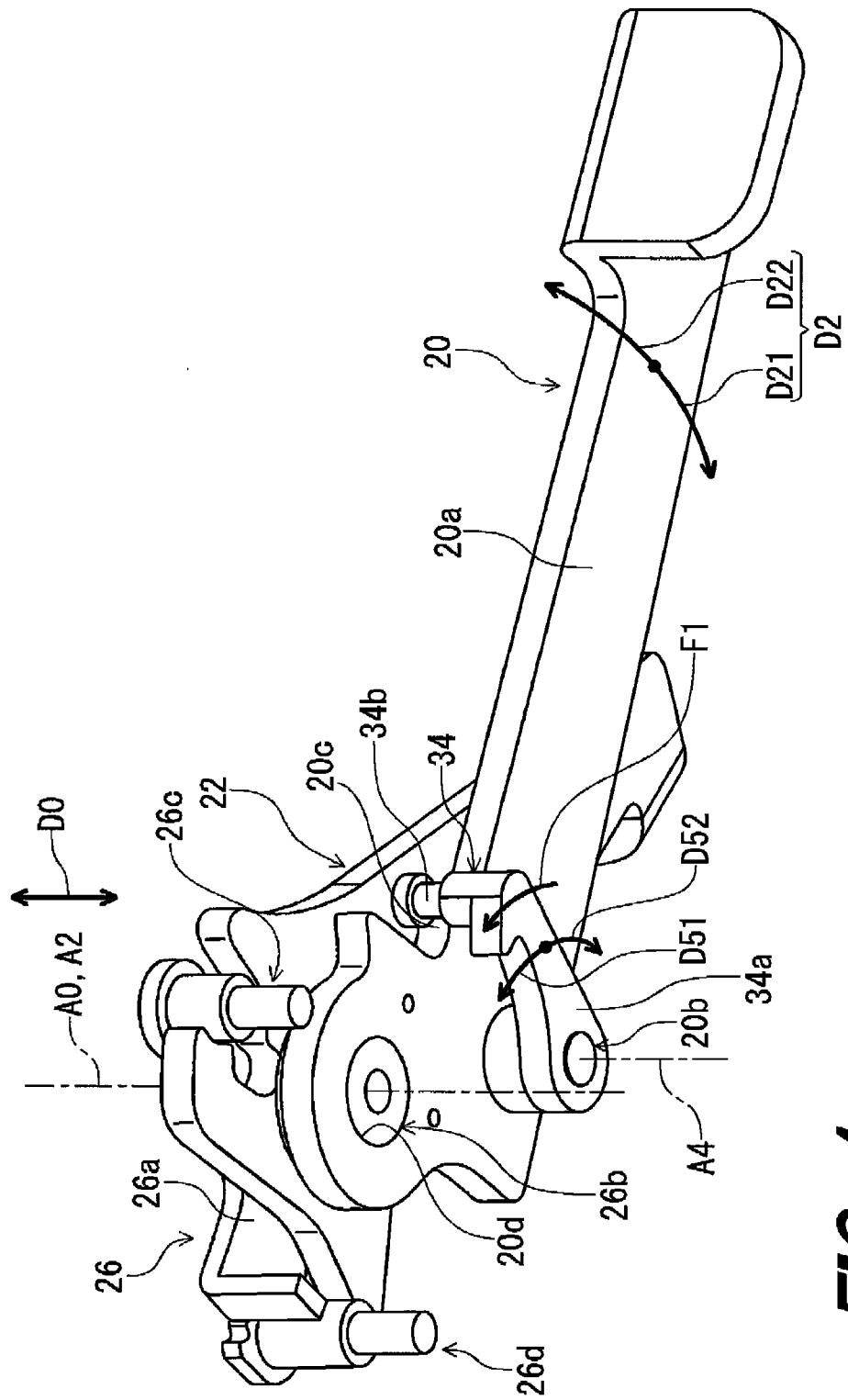
FIG. 4 is a perspective view of a part of the bicycle operating device illustrated in FIG. 1.

As seen in FIG. 4, the first pawl 34 includes a first pawl body 34a and a first contact part 34b. The first contact part 34b protrudes from the first pawl body 34a in the axial direction D0. The first operating member 20 includes a second contact part 20c contactable with the first contact part 34b. The first pawl 34 is biased by a first biasing member (not shown) to pivot relative to the first operating member 20 in a first pivot direction D51. The first contact part 34b is pressed against the second contact part 20c by first biasing force F1 of the first biasing member. The first pawl 34 is movable together with the first operating member 20 about the second pivot axis A2 (i.e., the rotational axis A0) in the pivot direction D2. The pivot direction D2 includes a first pivot direction D21 and a second pivot direction D22 opposite to the first pivot direction D21. The first operation of the first operating member 20 includes pivotal movement of the first operating member 20 in the first pivot direction D21, for example. The first pawl 34 is rotatable relative to the first operating member 20 in a second pivot direction D52 against the first biasing force F1 of the first biasing member. The second pivot direction D52 is opposite to the first pivot direction D51.

As seen in FIG. 4, the first operating member 20 includes a through hole 20d. The first shaft portion 26b extends through the through hole 20d to pivotably support the first operating member 20 relative to the first support member 26 (i.e., the base member 12 (FIG. 1)) about the rotational axis A0.

Figure 5:
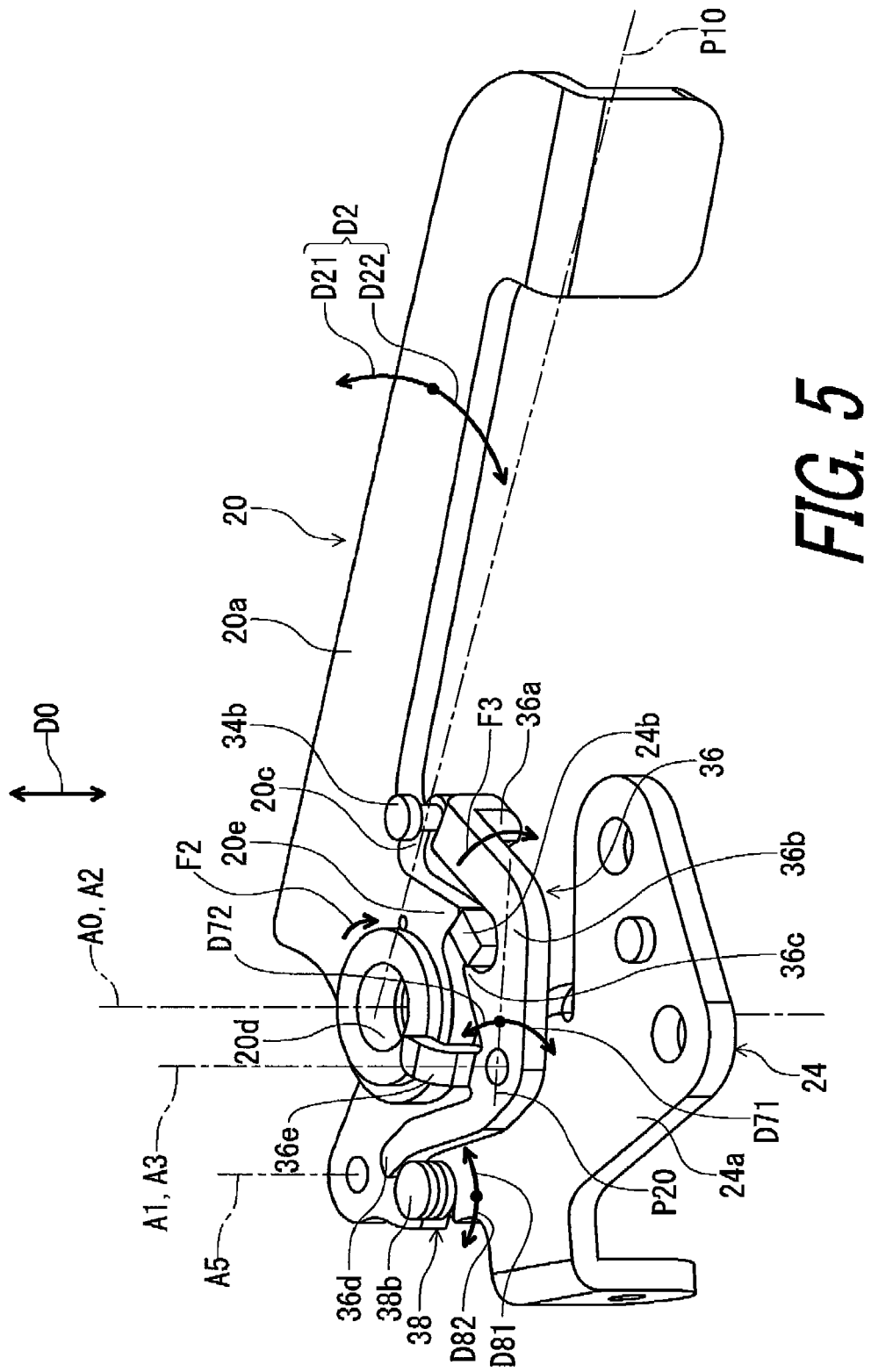
FIG. 5 is a perspective view of a part of the bicycle operating device illustrated in FIG. 1.

As seen in FIG. 5, the first operating member 20 includes a contact portion 20e protruding from the first lever plate 20a. The base plate 24 includes a base body 24a and a stopper 24b. As seen in FIGS. 2 and 5, the stopper 24b protrudes from the base body 24a in the axial direction D0. As seen in FIG. 5, the contact portion 20e is contactable with the stopper 24b. The first operating member 20 is biased by a second biasing member (not shown) to pivot relative to the base plate 24 about the rotational axis A0 in the second pivot direction D22. The contact portion 20e is pressed against the stopper 24b by second biasing force F2 of the second biasing member. The stopper 24b is configured to restrict the first operating member 20 from pivoting relative to the base plate 24 about the rotational axis A0 in the second pivot direction D22 to position the first operating member 20 at a first rest position P10. The first operating member 20 is rotatable relative to the base plate 24 about the rotational axis A0 in the first pivot direction D21 against the second biasing force F2 of the second biasing member.

In the present application, the term "rest position" as used herein refers to a position at which a movable part such as the first operating member 20 and the second operating member 22 remains stationary in a state where the movable part is not operated by the user. The term "operated position" as used herein refers to a position at which the movable part has been operated by the user to perform the operation of the bicycle component.

As seen in FIG. 5, the actuating member 36 is contactable with the stopper 24b. More specifically, the actuating member 36 includes an actuating main-body 36b and a protrusion 36c. The second pawl 36a protrudes from the actuating main-body 36b in the axial direction D0. The protrusion 36c protrudes from the actuating main-body 36b. The protrusion 36c is contactable with the stopper 24b. The actuating member 36 is biased by a third biasing member (not shown) to pivot relative to the base plate 24 in a first pivot direction D71. The protrusion 36c is pressed against the stopper 24b by third biasing force F3 of the third biasing member. The stopper 24b is configured to restrict the actuating member 36 from pivoting relative to the base plate 24 in the first pivot direction D71 to position the actuating member 36 at an initial position P20. The actuating member 36 is pivotable relative to the base plate 24 about the third pivot axis A3 in a second pivot direction D72 against the third biasing force F3 of the third biasing member. The second pivot direction D72 is opposite to the first pivot direction D71.

The actuating member 36 is configured to release the third pawl 38 from the ratchet member 32 in response to the second operation. More specifically, as seen in FIG. 3, the third pawl 38 includes a third pawl body 38a and a third contact part 38b. The third contact part 38b protrudes from the third pawl body 38a in the axial direction D0. The third pawl 38 is biased by a fourth biasing member (not shown) to pivot relative to the first support member 26 in a first pivot direction D81. The third pawl 38 is pivotable relative to the first support member 26 about the fifth pivot axis A5 in a second pivot direction D82 against fourth biasing force F4 of the fourth biasing member. The second pivot direction D82 is opposite to the first pivot direction D81.

Returning to FIG. 5, the actuating member 36 includes an actuating portion 36d configured to be contactable with the third pawl 38. The actuating portion 36d is substantially opposite to the second pawl 36a with respect to the third pivot axis A3. The actuating portion 36d is spaced apart from the third contact part 38b in a state where the actuating member 36 is disposed at the initial position P20. When the actuating member 36 is pivoted relative to the base plate 24 in the second pivot direction D72, the third contact part 38b of the third pawl 38 is pressed by the actuating portion 36d of the actuating member 36 in the second pivot direction D82. The actuating member 36 is pivoted about the third pivot axis A3 by the second operating member 22.

Figure 6:
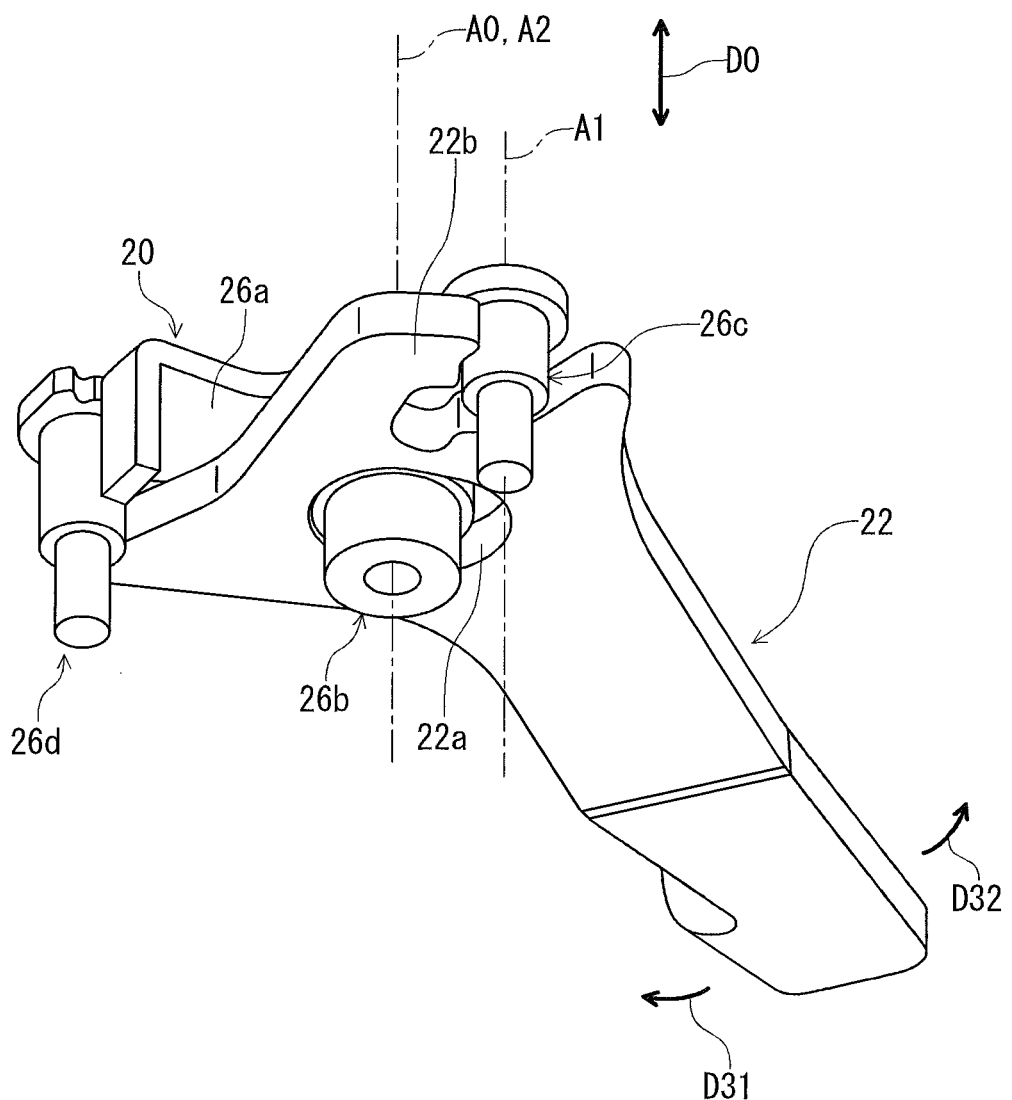
FIG. 6 is a perspective view of a part of the bicycle operating device illustrated in FIG. 1.

As seen in FIG. 6, the second operating member 22 includes an elongated hole 22a. The first shaft portion 26b extends through the elongated hole 22a to pivotably support the second operating member 22 about the second pivot axis A2. The second operating member 22 includes a support arm 22b configured to slidably contact an outer peripheral surface of the second shaft portion 26c. The second operating member 22 is pivotable relative to the first support member 26 (i.e., the base member 12) around the second shaft portion 26c. The second shaft portion 26c defines the first pivot axis A1. The elongated hole 22a allows the second operating member 22 to pivot relative to the base member 12 (FIG. 1) about the first pivot axis A1 in the first operating direction D31.

Figure 7:
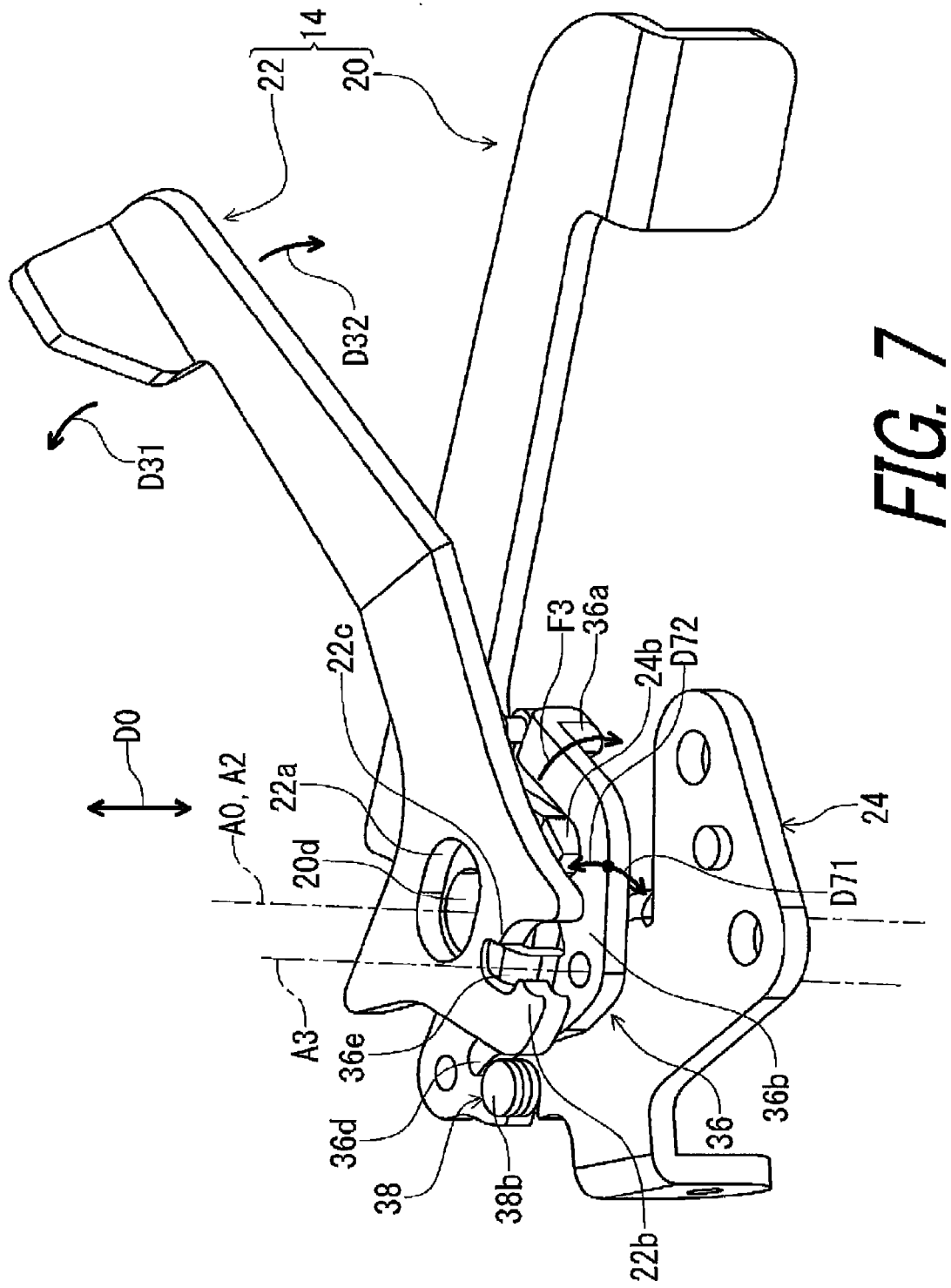
FIG. 7 is a perspective view of a part of the bicycle operating device illustrated in FIG. 1.

As seen in FIG. 7, the second operating member 22 is configured to actuate the actuating member 36 when the second operating member 22 is pivoted in each of the first operating direction D31 and the second operating direction D32. More specifically, the actuating member 36 includes a pawl portion 36e protruding from the actuating main-body 36b. The pawl portion 36e extends from the actuating main-body 36b toward the rotational axis A0. The second operating member 22 includes a contact portion 22c configured to be contactable with the pawl portion 36e. The actuating member 36 is pressed by the second operating member 22 via the contact portion 22c and the pawl portion 36e when the second operating member 22 is pivoted relative to the base plate 24 in the first operating direction D31 and the second operating direction D32, respectively. Accordingly, the actuating member 36 is pivoted relative to the base plate 24 in the second pivot direction D72 using the second operating member 22.

Figure 8:
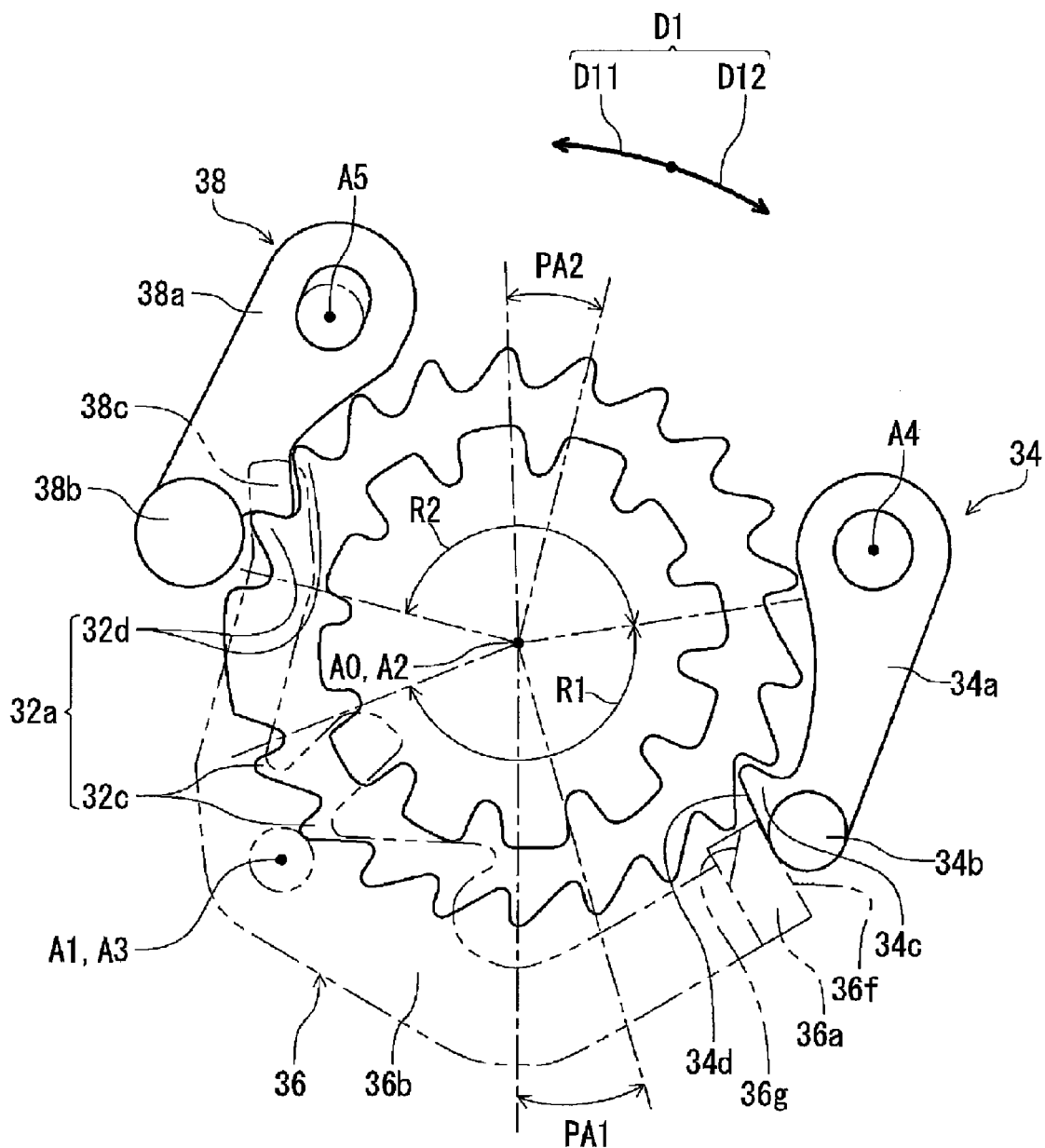
FIG. 8 is a plan view of a part of the bicycle operating device illustrated in FIG. 1.

As seen in FIG. 8, the ratchet teeth 32a of the ratchet member 32 includes first ratchet teeth 32c and second ratchet teeth 32d. The first pawl 34 includes a first tooth 34c configured to engage with one of the first ratchet teeth 32c. The first tooth 34c is disposed between adjacent two of the first ratchet teeth 32c. The first tooth 34c is spaced apart from the first ratchet teeth 32c with a gap in a state where the first operating member 20 is disposed at the first rest position P10 (FIG. 5). The third pawl 38 includes a third tooth 38c configured to engage with one of the second ratchet teeth 32d. The third pawl 38 slidably contacts the second ratchet teeth 32d.

The first ratchet teeth 32c are arranged in the rotational direction D1 at a pitch angle PA1. The second ratchet teeth 32d are arranged in the rotational direction D1 at the pitch angle PA2. The second ratchet teeth 32d have a shape different from a shape of the first ratchet teeth 32c. The second ratchet teeth 32d can, however, have a shape same as a shape of the first ratchet teeth 32c. The first ratchet teeth 32c are disposed within a first angular range R1. The second ratchet teeth 32d are disposed within a second angular range R2. In a case where the second ratchet teeth 32d have a shape same as a shape of the first ratchet teeth 32c, the first angular range R1 can at least partially overlap with the second angular range R2.

The second pawl 36a is configured to move the first pawl 34 away from the ratchet member 32. The second pawl 36a is configured to engage with one of the ratchet teeth 32a which is adjacent to the first pawl 34 in the first direction D11. The first pawl 34 includes a first contact surface 34d. The second pawl 36a includes a second contact surface 36f configured to slidably contact the first contact surface 34d to move the first pawl 34 away from the ratchet member 32.

Figure 9:
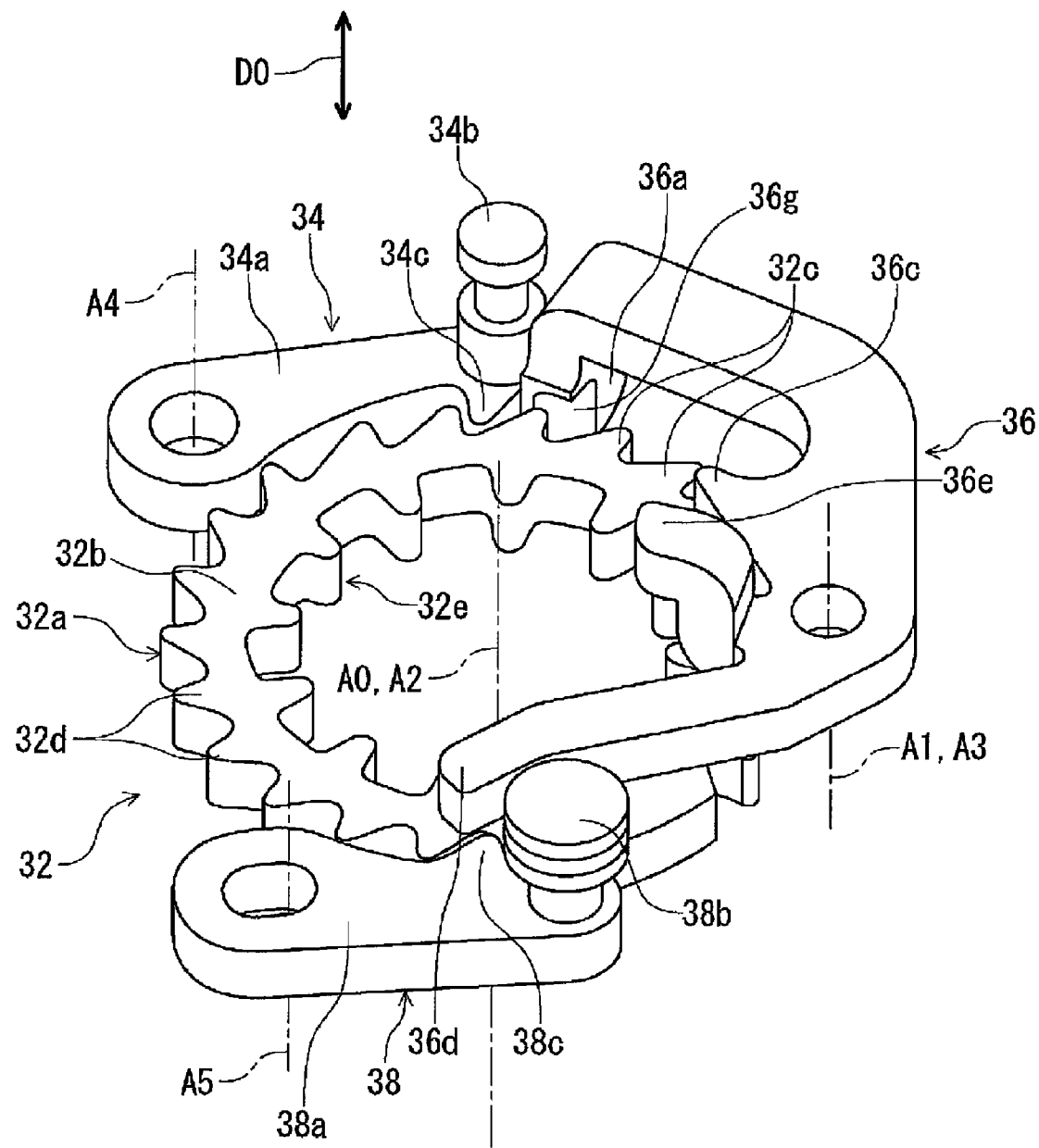
FIG. 9 is a perspective view of a part of the bicycle operating device illustrated in FIG. 1.

As seen in FIGS. 8 and 9, the second pawl 36a includes an inclined surface 36g. The inclined surface 36g is inclined with respect to the second contact surface 36f. The inclined surface 36g is parallel to the rotational axis A0. The inclined surface 36g allows the second pawl 36a to be smoothly inserted between adjacent two of the first ratchet teeth 32c.

Operations of the bicycle operating device 10 will be described below referring to FIGS. 10 to 18. Detail structures of the bicycle operating member 10 are omitted from FIGS. 10 to 18 except for the ratchet member 32, the first pawl 34, the actuating member 36, the third pawl 38, the first operating member 20 and the second operating member 22. Movement of each of these members indicates movement relative to the base member 12 (FIG. 1) in FIGS. 10 to 18. Movement of the ratchet member 32 indicates movement of the wire takeup member 30 relative to the base member 12 in FIGS. 10 to 18.

Figure 10:
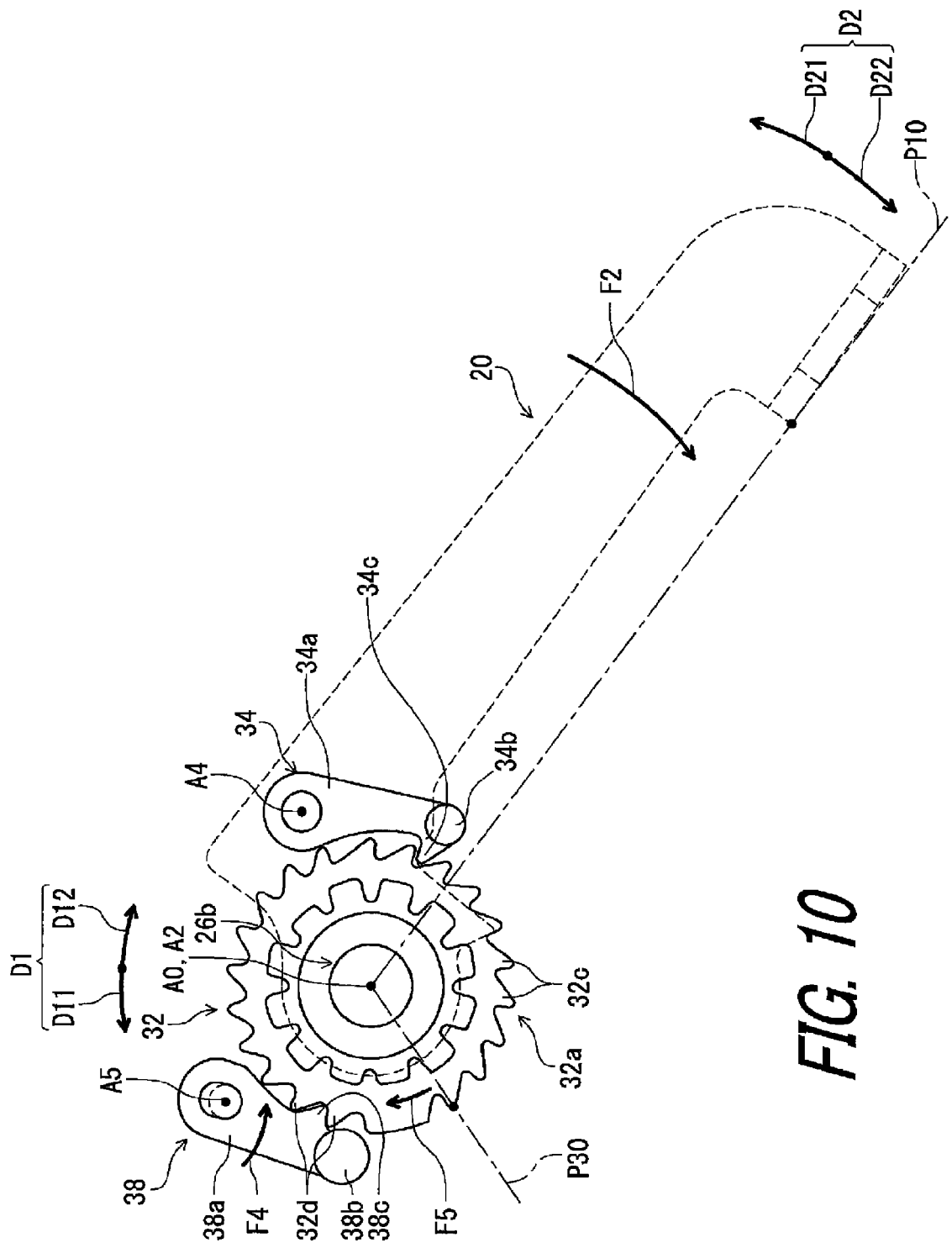
FIG. 10 is a schematic diagram showing operation of the bicycle operating device illustrated in FIG. 1.
Figure 11:
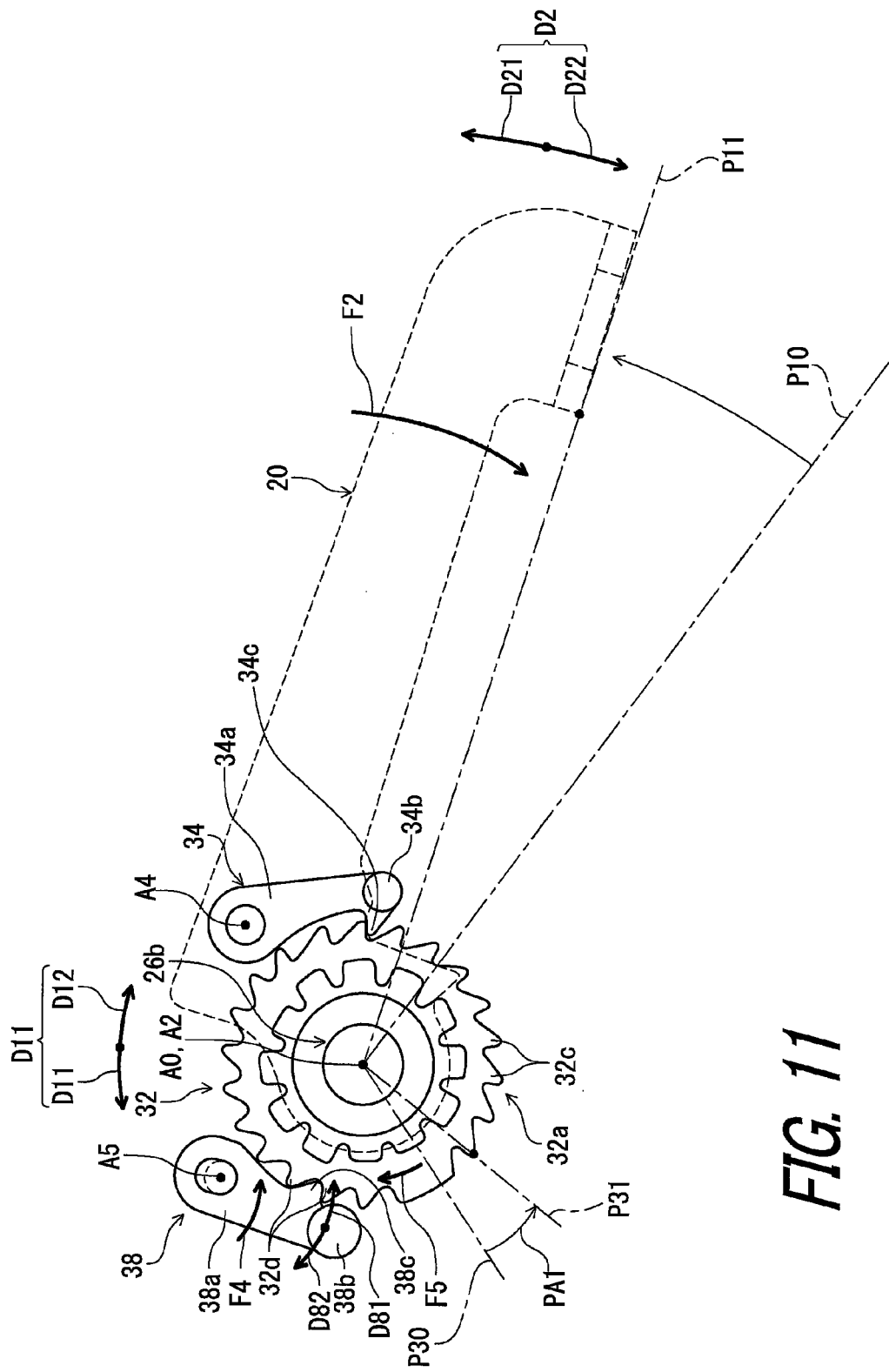
FIG. 11 is a schematic diagram showing operation of the bicycle operating device illustrated in FIG. 1.
Figure 12:
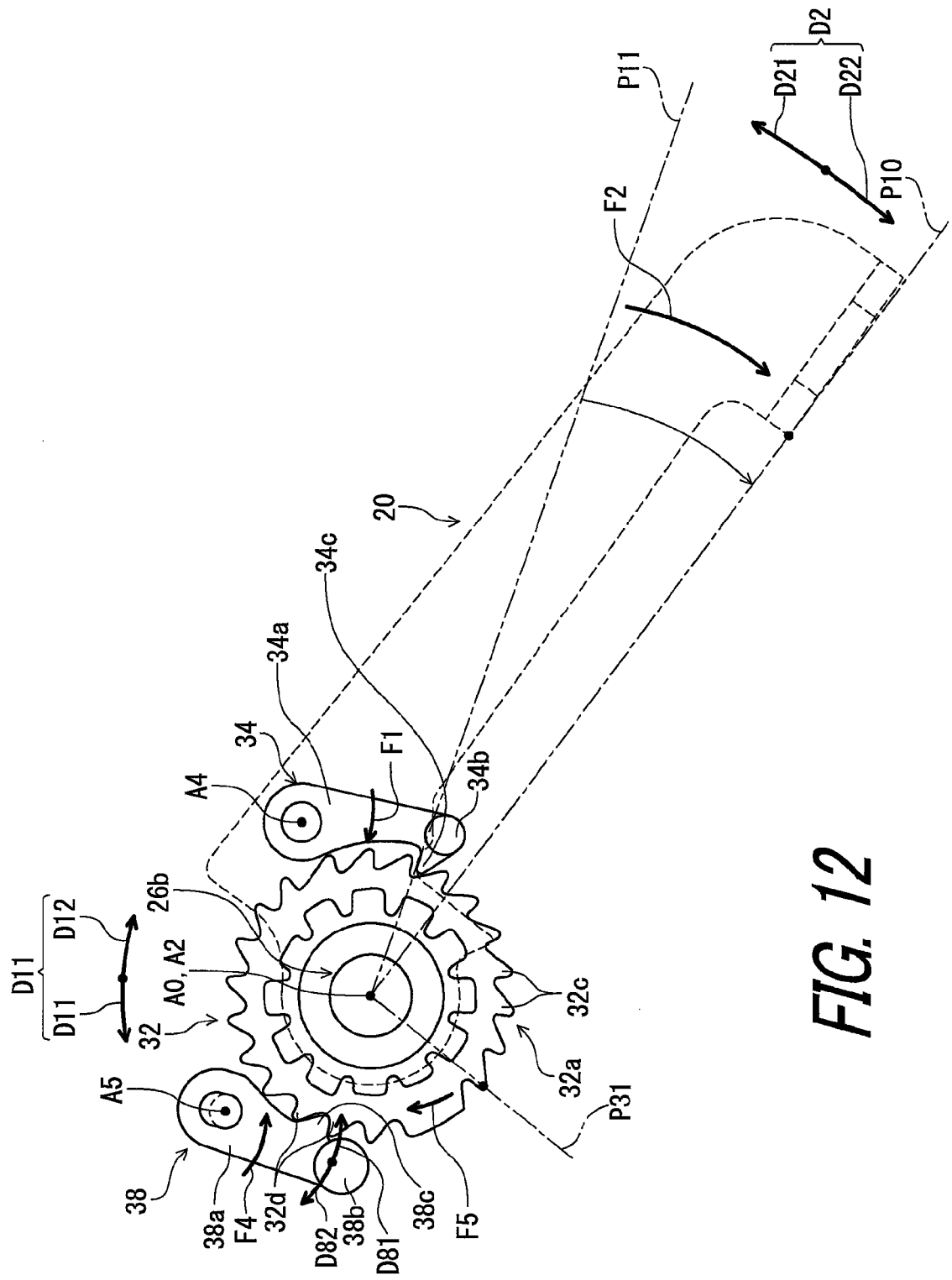
FIG. 12 is a schematic diagram showing operation of the bicycle operating device illustrated in FIG. 1.

FIGS. 10 to 12 illustrate the first operation to wind the inner wire 2a (FIG. 2) of the control cable 2. As seen in FIG. 10, the wire takeup member 30 is biased by a fifth biasing member (not shown) to rotate about the rotational axis A0 in the second direction D12. The ratchet member 32 (i.e., the wire takeup member 30) is restricted from rotating against fifth biasing force F5 of the fifth biasing member in the second direction D12 in a state where the third tooth 38c of the third pawl 38 engages with the second ratchet teeth 32d of the ratchet teeth 32a. In this state, for example, the ratchet member 32 is disposed at a rotational position P30. The first tooth 34c of the first pawl 34 is disposed between adjacent two of the first ratchet teeth 32c of the ratchet teeth 32a with a gap in a state where the first operating member 20 is disposed at the first rest position P10.

As seen in FIG. 11, when the first operating member 20 is pivoted about the rotational axis A0 in the first pivot direction D21 by the user, the first tooth 34c of the first pawl 34 comes into contact with one of the first ratchet teeth 32c. When the first operating member 20 is further pivoted about the rotational axis A0 in the first pivot direction D21, the ratchet member 32 is rotated about the rotational axis A0 in the first direction D11 against the fifth biasing force F5. Since the third pawl 38 is biased in the first pivot direction D81 by the fourth biasing force F4, the third tooth 38c of the third pawl 38 slides with one of the second ratchet teeth 32d while the ratchet member 32 is rotated about the rotational axis A0 in the first direction D11. When the first operating member 20 reaches an operated position P11, the ratchet member 32 is rotated about the rotational axis A0 by the pitch angle PA1 in the first direction D11. In this state, the third pawl 38 positions the ratchet member 32 at a rotational position P31 against the fifth biasing force F5.

As seen in FIG. 12, when the operation force applied to the first operating member 20 is released by the user, the first operating member 20 is pivoted about the rotational axis A0 in the second pivot direction D22 by the second biasing force F2. The first tooth 34c slides with and gets over one of the first ratchet teeth 32c against the first biasing force F1 while the first operating member 20 is returned to the first rest position P10 by the second biasing force F2.

The wire takeup member 30 (FIG. 2) and the ratchet member 32 are rotated about the rotational axis A0 in the first direction D11 to wind the inner wire 2a (FIG. 2) based on the above operations of FIGS. 10 to 12.

Figure 13:
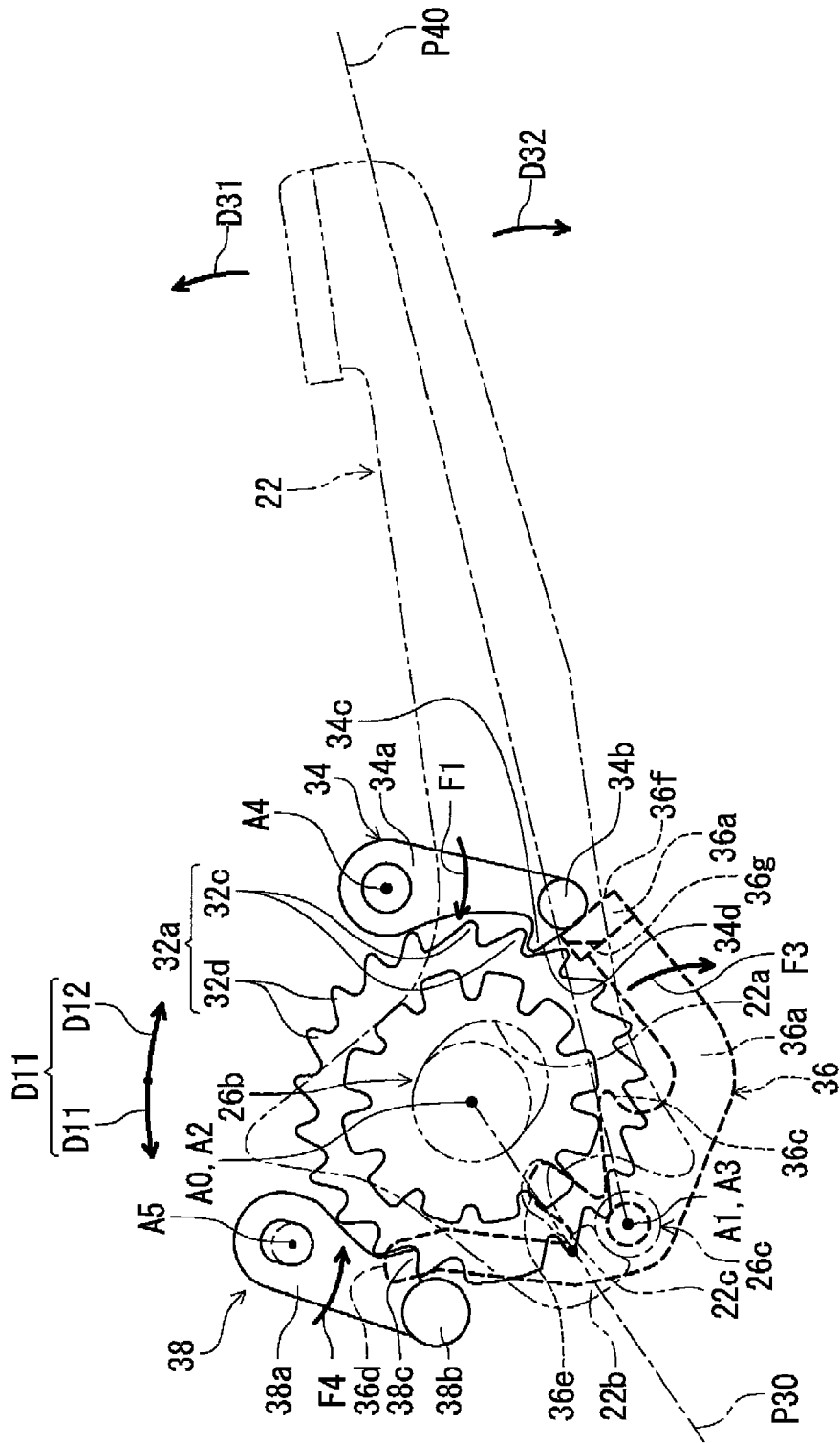
FIG. 13 is a schematic diagram showing operation of the bicycle operating device illustrated in FIG. 1.

FIGS. 13 to 16 illustrate the second operation to unwind the inner wire 2a (FIG. 2). As seen in FIG. 13, when the second operating member 22 is disposed at a second rest position P40, the second contact surface 36f of the second pawl 36a is in contact with the first contact surface 34d of the first pawl 34. In this state, the second operating member 22 is positioned at the second rest position P40 by the actuating member 36, the first shaft portion 26b, and the second shaft portion 26c.

Figure 14:
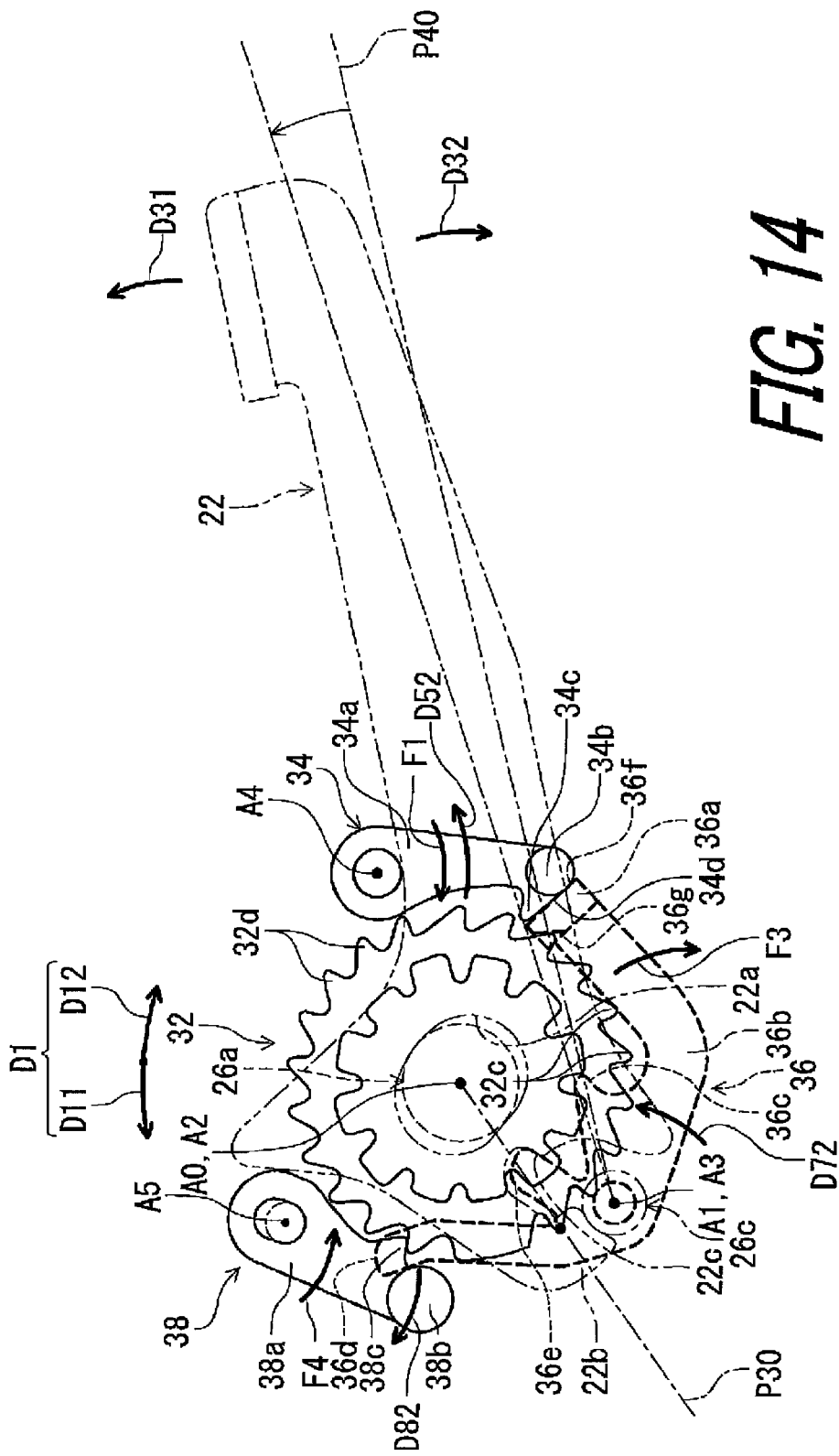
FIG. 14 is a schematic diagram showing operation of the bicycle operating device illustrated in FIG. 1.

As seen in FIG. 14, when the second operating member 22 is operated in the first operating direction D31 by the user, the second operating member 22 is pivoted about the first pivot axis A1 in the first operating direction D31 within a pivotable range defined by the elongated hole 22a. This causes the contact portion 22c of the second operating member 22 to press the pawl portion 36e of the actuating member 36 so that the actuating member 36 is pivoted about the first pivot axis A1 in the second pivot direction D72.

The second contact surface 36f of the second pawl 36a slides with the first contact surface 34d of the first pawl 34 while the actuating member 36 is pivoted about the first pivot axis A1 in the second pivot direction D72. As a result, the first pawl 34 is pivoted about the fourth pivot axis A4 in the second pivot direction D52, which causes the first pawl 34 to be moved away from the ratchet member 32.

As seen in FIG. 14, when the actuating member 36 is pivoted in the second pivot direction D72, the actuating portion 36d presses the third contact part 38b of the third pawl 38. As a result, the third pawl 38 is pivoted about the fifth pivot axis A5 in the second pivot direction D82, which causes the third tooth 38c to be moved away from the ratchet member 32. In the state illustrated in FIG. 14, the second pawl 36a and the third pawl 38 respectively engages with one of the first ratchet teeth 32c and one of the second ratchet teeth 32d to position the ratchet member 32 in the rotational direction D1.

Figure 15:
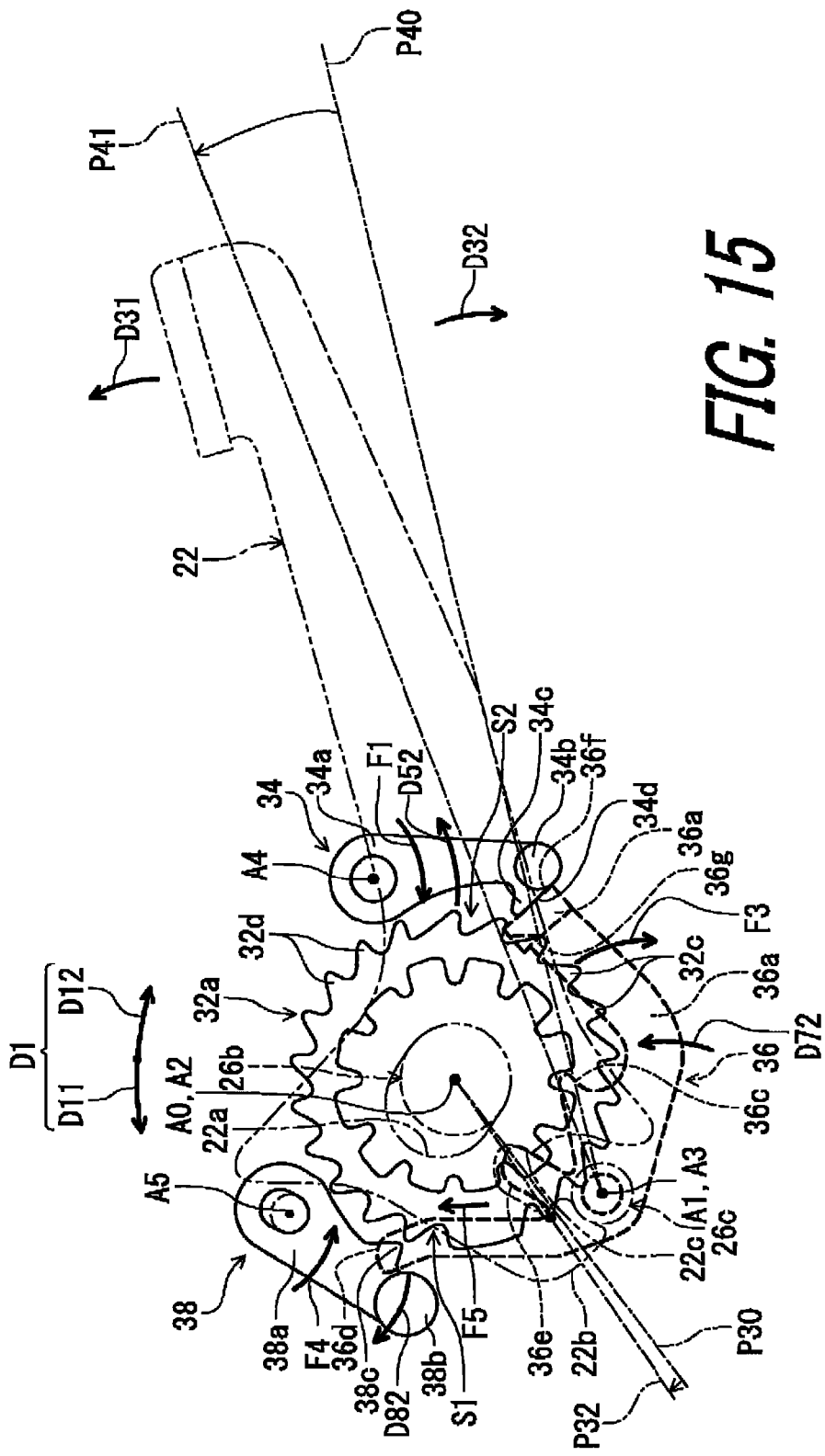
FIG. 15 is a schematic diagram showing operation of the bicycle operating device illustrated in FIG. 1.

As seen in FIG. 15, when the second operating member 22 is further pivoted about the first pivot axis A1 in the first operating direction D31 to a first operated position P41, the actuating member 36 is further pivoted about the third pivot axis A3 in the second pivot direction D72. This causes the second pawl 36a to engage with adjacent two of the first ratchet teeth 32c.

Similarly, the actuating portion 36d further presses the third contact part 38b of the third pawl 38, which causes the third pawl 38 to be further pivoted about the fifth pivot axis A5 in the second pivot direction D82. Accordingly, the engagement between the third pawl 38 and the second ratchet teeth 32d is released. In this state, the ratchet member 32 is restricted from rotating about the rotational axis A0 by the second pawl 36a of the actuating member 36.

As seen in FIGS. 13 to 15, in a state where the second pawl 36a restricts the ratchet member 32 from rotating about the rotational axis A0, a rotational position P32 of the ratchet member 32 is offset from the rotational position P30 in the second direction D12.

Figure 16:
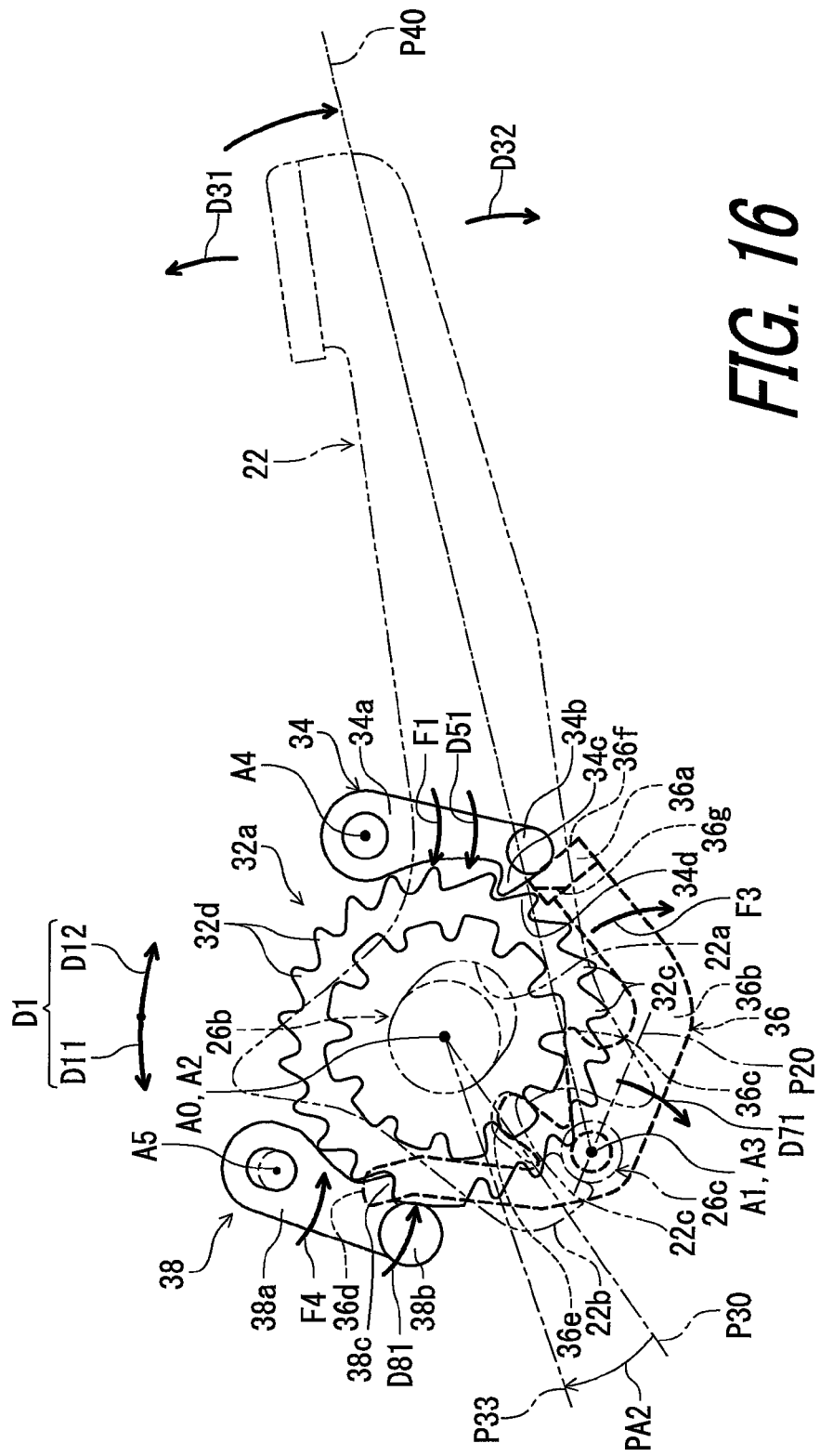
FIG. 16 is a schematic diagram showing operation of the bicycle operating device illustrated in FIG. 1.

As seen in FIG. 16, when the operation force applied to the second operating member 22 is released by the user, the actuating member 36 is pivoted to the initial position P20 about the third pivot axis A3 in the first pivot direction D71 by the third biasing force F3. The second operating member 22 is pivoted to the second rest position P40 about the first pivot axis A1 in the second operating direction D32.

The second contact surface 36f of the second pawl 36a slides with the first contact surface 34d of the first pawl 34 while the actuating member 36 is pivoted about the third pivot axis A3 in the first pivot direction D71. As a result, the first pawl 34 is pivoted about the fourth pivot axis A4 in the first pivot direction D51 by the first biasing force F1, which causes the first pawl 34 to be inserted between adjacent two of the first ratchet teeth 32c.

The third pawl 38 is pivoted about the fifth pivot axis A5 in the first pivot direction D81 by the fourth biasing force F4. This causes the third tooth 38c to be inserted between adjacent two of the second ratchet teeth 32d to engage with one of the second ratchet teeth 32d. As seen in FIG. 15, since the ratchet member 32 is biased by the fifth biasing force F5, the third tooth 38c is inserted in a space 51. As seen in FIG. 16, the ratchet member 32 is positioned at a rotational position P33 offset from the rotational position P30 in the second direction D12 by the pitch angle PA2. In this state, the first tooth 34c is disposed in a space S2 (FIG. 15) of the first ratchet teeth 32c.

The wire takeup member 30 (FIG. 2) and the ratchet member 32 are rotated about the rotational axis A0 in the second direction D12 to unwind the inner wire 2a (FIG. 2) of the control cable 2 based on the above operations of FIGS. 13 to 16.

Figure 17:
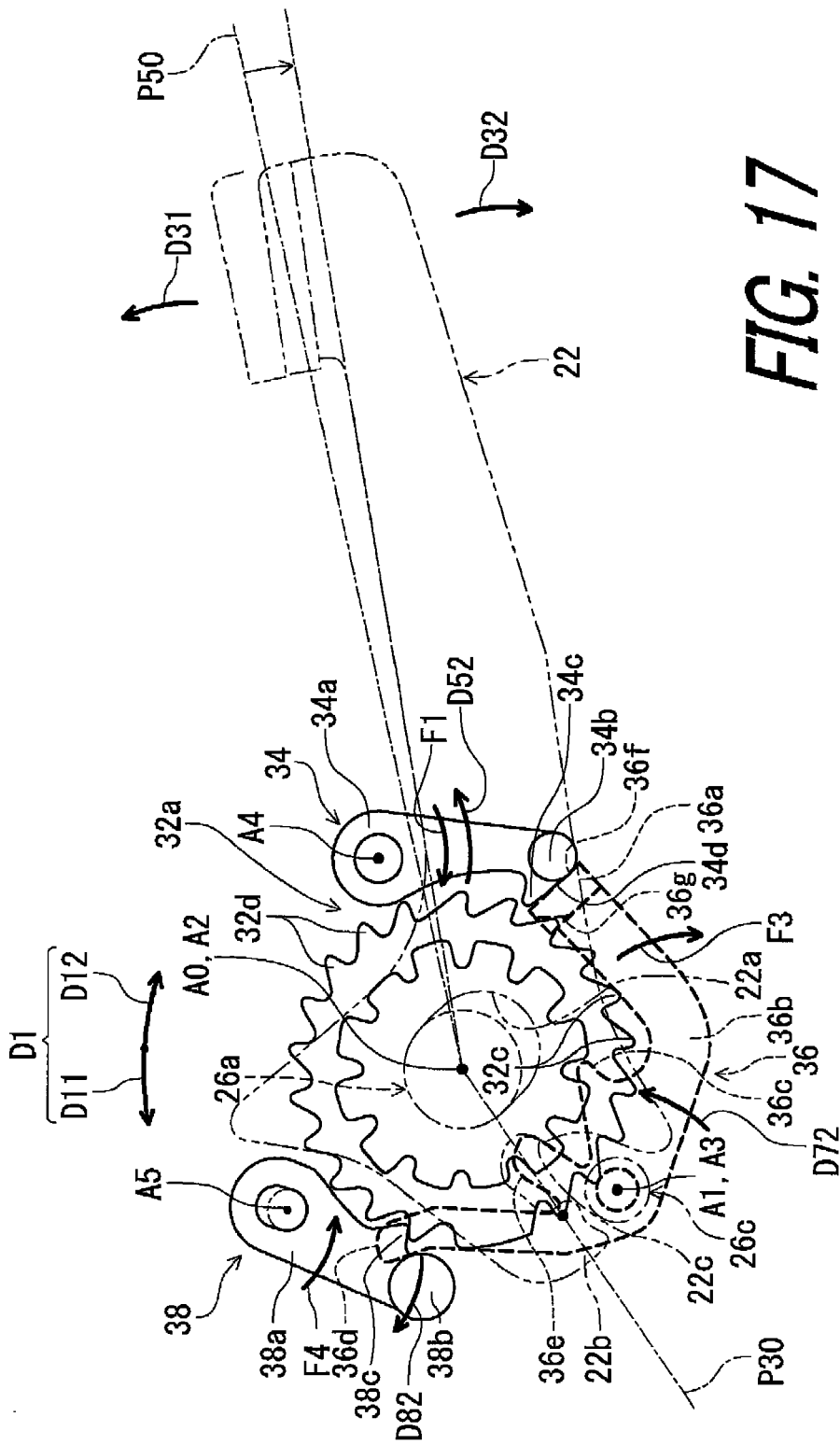
FIG. 17 is a schematic diagram showing operation of the bicycle operating device illustrated in FIG. 1.
Figure 18:
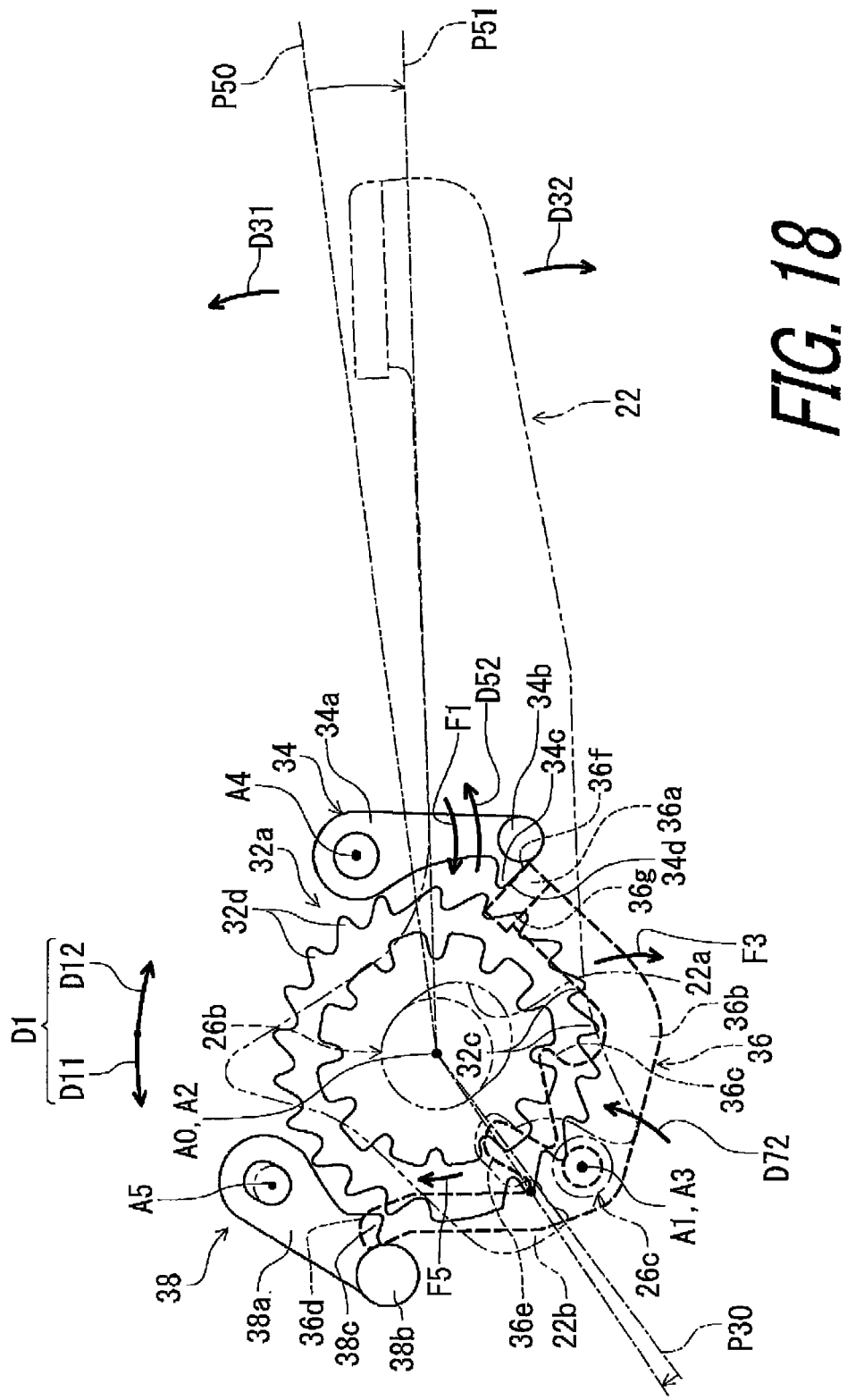
FIG. 18 is a schematic diagram showing operation of the bicycle operating device illustrated in FIG. 1.

FIGS. 17 and 18 illustrate another second operation to unwind the inner wire 2a (FIG. 2).

As seen in FIG. 17, the second operating member 22 is disposed at a third rest position P50. The third rest position P50 is defined based on the rotational axis A0 while the second rest position P40 illustrated in FIG. 15 is defined based on the first pivot axis A1. The third rest position P50 indicates the same position of the second operating member 22 as the second rest position P40.

When the second operating member 22 is operated in the second operating direction D32 by the user, the second operating member 22 is pivoted about the second pivot axis A2 (the rotational axis A0) in the second operating direction D32 from the third rest position P50. This causes the contact portion 22c of the second operating member 22 to press the pawl portion 36e of the actuating member 36. The positional relationship between the ratchet member 32, the first pawl 34, the actuating member 36 and the third pawl 38 is substantially the same states as the positional relationship illustrated in FIG. 14 except for the second operating member 22.

As seen in FIG. 18, when the second operating member 22 is further pivoted about the second pivot axis A2 in the second operating direction D32 to a second operated position P51, the actuating member 36 is further pivoted about the third pivot axis A3 in the second pivot direction D72. The positional relationship between the ratchet member 32, the first pawl 34, the actuating member 36 and the third pawl 38 is substantially the same states as the positional relationship illustrated in FIG. 15 except for the second operating member 22.

When the user releases the second operating member 22, the third pawl 38 engages with one of the second ratchet teeth 32d as well as the operation illustrated in FIG. 16. The wire takeup member 30 (FIG. 2) and the ratchet member 32 are rotated about the rotational axis A0 in the second direction D12 to unwind the inner wire 2a (FIG. 2) of the control cable based on the above operations of FIGS. 17 and 18.

With the bicycle operating device 10, in response to the second operation of the operating construction 14, the actuating member 36 is configured to move the first pawl 34 away from the ratchet member 32 and to engage the second pawl 36a with one of the ratchet teeth 32a. Accordingly, a member configured to move the first pawl 34 away from the ratchet member 32 can be omitted from the bicycle operating device 10, allowing structures of the bicycle operating device 10 to be simplified.

Second Embodiment

A bicycle operating device 210 in accordance with a second embodiment will be described below referring to FIG. 19. The bicycle operating device 210 has substantially the same configuration as the bicycle operating device 10 except for the actuating member. Thus, elements having substantially the same function as those in the first embodiment will be numbered the same here, and will not be described again in detail here for the sake of brevity.

Figure 19:
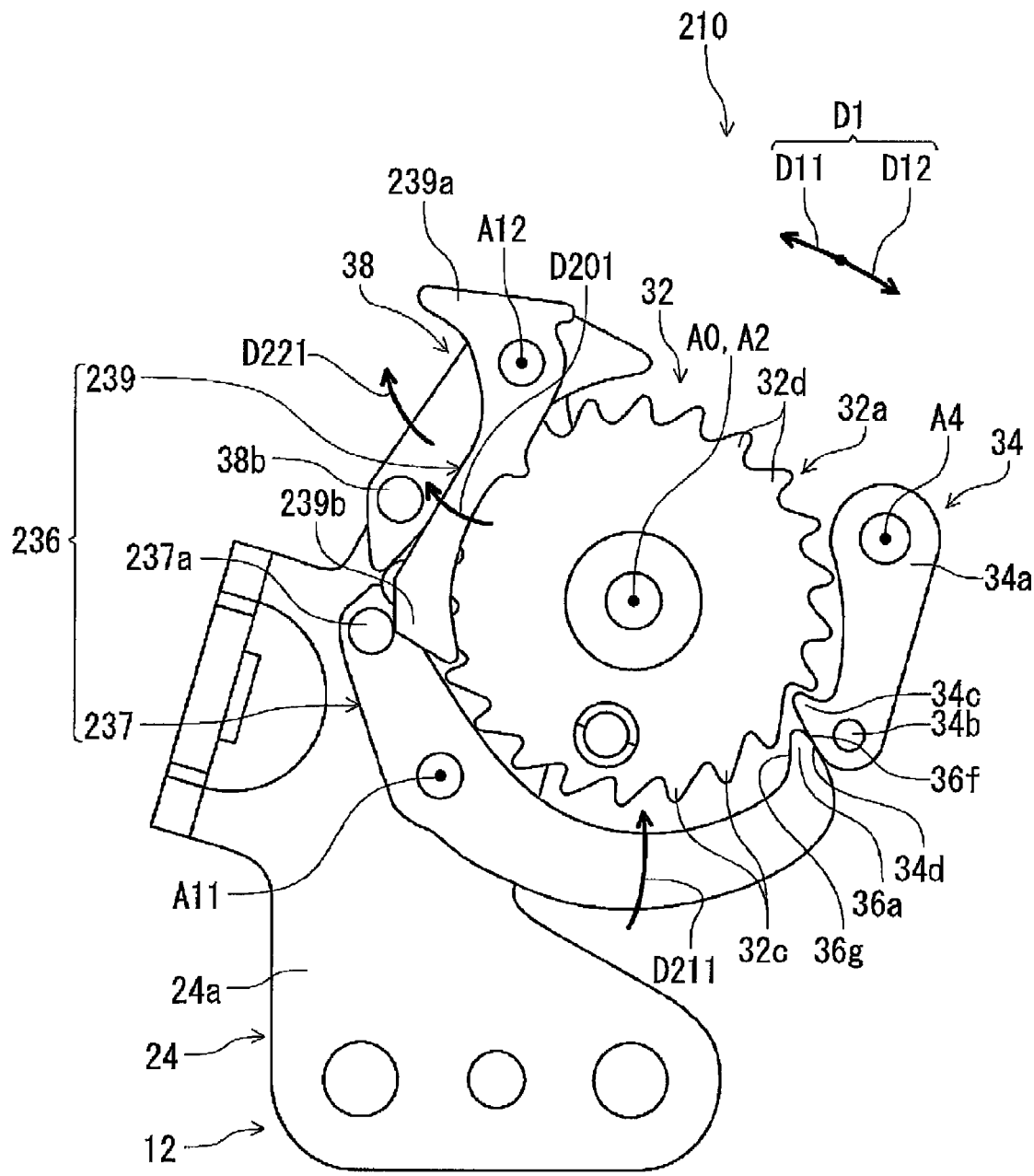
FIG. 19 is a plan view of a part of a bicycle operating device in accordance with a second embodiment.

As seen in FIG. 19, the bicycle operating device 210 comprises an actuating member 236. The actuating member 236 includes a first part 237 and a second part 239. The first part 237 is configured to be pivotable relative to the base member 12 about a first actuating axis A11 and includes the second pawl 36a. The second part 239 is configured to be pivotable relative to the base member 12 about a second actuating axis A12. The first actuating axis A11 differs from the second actuating axis A12. The first actuating axis A11 is parallel to the second actuating axis A12.

The second part 239 is configured to pivot the first part 237 such that the second pawl 36a moves the first pawl 34 away from the ratchet member 32 and to prevent rotation of the wire takeup member 30 in the second direction D12. More specifically, the first part 237 includes a first contact portion 237a configured to contact the second part 239. The first contact portion 237a is substantially opposite to the second pawl 36a with respect to the first actuating axis A11. The second part 239 includes a first end 239a and a second end 239b opposite to the first end 239a. The first end 239a is pressed by the second operating member 22 described in the first embodiment, for example. The second end 239b is configured to contact the first contact portion 237a. When the first end 239a of the second part 239 is pressed by the second operating member 22 in response to the second operation, the second part 239 is rotated relative to the base member 12 about the second actuating axis A12 in a first pivot direction D201. At this time, the second end 239b presses the first contact portion 237a, which causes the first part 237 to rotate relative to the base member 12 about the first actuating axis A11 in a first pivot direction D211. Accordingly, the second pawl 36a moves the first pawl 34 away from the ratchet member 32.

The second part 239 of the actuating member 236 is configured to release the third pawl 38 from the ratchet member 32 in response to the second operation. More specifically, the second part 239 is configured to contact the third contact part 38b of the third pawl 38 such that the third pawl 38 is pivoted about the second actuating axis A12 in a first pivot direction D221 in response to the second operation.

Since operations of the bicycle operating device 210 is substantially the same as that of the bicycle operating device 10, they will not be described in detail here for the sake of brevity.

With the bicycle operating device 210, in response to the second operation, the actuating member 236 is configured to move the first pawl 34 away from the ratchet member 32 and to engage the second pawl 36a with one of the ratchet teeth 32a. Accordingly, a member configured to move the first pawl 34 away from the ratchet member 32 can be omitted from the bicycle operating device 210, which allows structures of the bicycle operating device 210 to be simplified.

In the present application, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member;
   an operating construction coupled to the base member;
   a wire takeup member configured to be rotatable relative to the base member about a rotational axis in a first direction and a second direction opposite to the first direction;
   a ratchet member having ratchet teeth and configured to be rotatable with the wire takeup member between a plurality of predetermined positions;
   a first pawl configured to engage with one of the ratchet teeth to transmit a first operation movement from the operating construction to movement of the wire takeup member through the first pawl in the first direction in response to a first operation of the operating construction; and
   an actuating member including a second pawl, the actuating member being configured to move the first pawl away from the ratchet member and to engage the second pawl with the one of the ratchet teeth, in response to a second operation of the operating construction.

2. The bicycle operating device according to claim 1, wherein
   the actuating member is configured such that the second pawl moves the first pawl away from the ratchet member and engages with the one of the ratchet teeth which is adjacent to the first pawl in the first direction.

3. The bicycle operating device according to claim 2, wherein
   the first pawl includes a first contact surface, and
   the second pawl includes a second contact surface configured to slidably contact the first contact surface to move the first pawl away from the ratchet member.

4. The bicycle operating device according to claim 1, wherein
   the operating construction includes
      a first operating member configured to be movable relative to the base member to provide the first operation, and
      a second operating member configured to be movable relative to the base member to provide the second operation.

5. The bicycle operating device according to claim 4, wherein
   the second operating member is pivotable relative to the base member in a first operating direction and a second operating direction opposite to the first operating direction, and
   the second operating member is configured to actuate the actuating member when the second operating member is pivoted in each of the first operating direction and the second operating direction.

6. The bicycle operating device according to claim 1, wherein
   the first pawl includes a first contact surface,
   the second pawl includes a second contact surface configured to slidably contact the first contact surface, and
   the actuating member is configured to respectively move the first contact surface and the second contact surface relative to the ratchet member in directions opposite to each other in response to the second operation of the operating construction.

7. The bicycle operating device according to claim 1, wherein
   the first pawl includes a first tooth configured to contact the one of the ratchet teeth of the ratchet member, and
   the actuating member is configured to respectively move the first tooth and the second pawl relative to the ratchet member in directions opposite to each other in response to the second operation of the operating construction.

8. The bicycle operating device according to claim 1, wherein
   the first pawl includes a first tooth configured to contact the one of the ratchet teeth of the ratchet member,
   the actuating member is pivotable relative to the base member about a third pivot axis,
   the first pawl is pivotable relative to the base member about a fourth pivot axis, and
   a distance defined between the first tooth and the second pawl is shorter than a distance defined between the third pivot axis and the fourth pivot axis.

9. The bicycle operating device according to claim 1, wherein
   the operating construction includes a first operating member configured to be movable relative to the base member to provide the first operation, and
   the first pawl is pivotally provided on the first operating member.

10. The bicycle operating device according to claim 1, wherein
    the second pawl is configured to engage with the one of the ratchet teeth without transmitting movement of the operating construction to movement of the wire takeup member through the second pawl in response to the second operation.

11. The bicycle operating device according to claim 1, wherein
    the second operation of the operating construction includes a first pivotal movement, and
    the actuating member is configured to engage the second pawl with the one of the ratchet teeth without transmitting the first pivotal movement of the operating construction to the wire takeup member through the second pawl in response to the first pivotal movement.

12. The bicycle operating device according to claim 1, wherein
the second operation of the operating construction includes a first pivotal movement,
the actuating member is pivotable relative to the base member about a third pivot axis, and
the third pivot axis of the actuating member differs from the rotational axis of the wire takeup member to engage the second pawl with the one of the ratchet teeth without transmitting the first pivotal movement of the operating construction to the wire takeup member through the second pawl in response to the first pivotal movement.

13. The bicycle operating device according to claim 1, wherein
the first operation of the operating construction includes a pivotal movement, and
the first pawl is configured to engage with the one of the ratchet teeth to transmit the pivotal movement of the operating construction to the wire takeup member through the first pawl in the first direction in response to the pivotal movement of the operating construction.

14. A bicycle operating device comprising:
a base member;
an operating construction coupled to the base member;
a wire takeup member configured to be rotatable relative to the base member about a rotational axis in a first direction and a second direction opposite to the first direction;
a ratchet member having ratchet teeth and configured to be rotatable with the wire takeup member between a plurality of predetermined positions;
a first pawl configured to engage with one of the ratchet teeth to transmit a first operation force from the operating construction to the wire takeup member through the first pawl in the first direction in response to a first operation of the operating construction;
an actuating member including a second pawl, the actuating member being configured to move the first pawl away from the ratchet member and to engage the second pawl with the one of the ratchet teeth, in response to a second operation of the operating construction; and
a third pawl configured to engage with another of the ratchet teeth of the ratchet member to position the ratchet member in one of the plurality of predetermined positions.

15. The bicycle operating device according to claim 14, wherein
the actuating member is configured to release the third pawl from the ratchet member in response to the second operation.

16. The bicycle operating device according to claim 15, wherein
the actuating member includes
a first part configured to be pivotable relative to the base member about a first actuating axis and including the second pawl, and
a second part configured to be pivotable relative to the base member about a second actuating axis, and
the first actuating axis differs from the second actuating axis.

17. A bicycle operating device comprising:
a base member;
an operating construction coupled to the base member;
a wire takeup member configured to be rotatable relative to the base member about a rotational axis in a first direction and a second direction opposite to the first direction;
a ratchet member having ratchet teeth and configured to be rotatable with the wire takeup member between a plurality of predetermined positions;
a first pawl configured to engage with one of the ratchet teeth so as to rotate the wire takeup member in the first direction in response to a first operation of the operating construction;
an actuating member including a second pawl, the actuating member being configured to move the first pawl away from the ratchet member and to engage the second pawl with the one of the ratchet teeth, in response to a second operation of the operating construction; and
a third pawl configured to engage with another of the ratchet teeth of the ratchet member to position the ratchet member in one of the plurality of predetermined positions,
the actuating member being configured to release the third pawl from the ratchet member in response to the second operation,
the actuating member including
a first part configured to be pivotable relative to the base member about a first actuating axis and including the second pawl, and
a second part configured to be pivotable relative to the base member about a second actuating axis,
the first actuating axis differing from the second actuating axis, and
the first actuating axis being parallel to the second actuating axis.

18. The bicycle operating device according to claim 16, wherein
the second part of the actuating member is configured to release the third pawl from the ratchet member in response to the second operation.

19. The bicycle operating device according to claim 18, wherein
the second part is configured to pivot the first part such that the second pawl moves the first pawl away from the ratchet member and to prevent rotation of the wire takeup member in the second direction.

20. A bicycle operating device comprising:
a base member;
an operating construction coupled to the base member;
a wire takeup member configured to be rotatable relative to the base member about a rotational axis in a first direction and a second direction opposite to the first direction;
a ratchet member having ratchet teeth and configured to be rotatable with the wire takeup member between a plurality of predetermined positions;
a first pawl configured to engage with one of the ratchet teeth so as to rotate the wire takeup member in the first direction in response to a first operation of the operating construction; and
an actuating member including a second pawl, the actuating member being configured to move the first pawl away from the ratchet member and to engage the second pawl with the one of the ratchet teeth, in response to a second operation of the operating construction,
the operating construction including a first operating member configured to be movable relative to the base member to provide the first operation, and a second operating member configured to be movable relative to the base member to provide the second operation, the second operating member being pivotable relative to the base member in a first operating direction and a second operating direction opposite to the first operating direction, the second operating member being configured to actuate the actuating member when the second operating member is pivoted in each of the first operating direction and the second operating direction, the second operating member being configured to be pivotable about a first pivot axis in the first operating direction and about a second pivot axis in the second operating direction, and the first pivot axis differing from the second pivot axis.

21. The bicycle operating device according to claim 20, wherein
the first pivot axis is parallel to the second pivot axis.

22. The bicycle operating device according to claim 20, wherein
the second pivot axis is coaxial with the rotational axis of the wire takeup member.

23. The bicycle operating device according to claim 20, wherein
the actuating member is configured to be pivotable relative to the base member about a third pivot axis, and
the third pivot axis is coaxial with the first pivot axis of the second operating member.

24. The bicycle operating device according to claim 20, wherein
the first pawl is pivotally provided on the first operating member about a fourth pivot axis, and
the first operating member is pivotable relative to the base member about the rotational axis of the wire takeup member.

25. A bicycle operating device comprising:
a base member;
an operating construction coupled to the base member, the operating construction having a rest position and an operated position;
a wire takeup member configured to be rotatable relative to the base member about a rotational axis in a first direction and a second direction opposite to the first direction;
a ratchet member having ratchet teeth and configured to be rotatable with the wire takeup member between a plurality of predetermined positions;
a first pawl configured to engage with one of the ratchet teeth to transmit a first operation movement from the operating construction to movement of the wire takeup member through the first pawl in the first direction in response to a first operation of the operating construction; and an actuating member including a second pawl configured to disengage from the ratchet teeth in a rest state where the operating construction is at the rest position, the actuating member being configured to move the first pawl away from the ratchet member and to engage the second pawl with the one of the ratchet teeth, in response to a second operation of the operating construction from the rest position to the operated position, the second pawl being configured to disengage from the ratchet teeth in response to a third operation of the operating construction from the operated position to the rest position.

26. The bicycle operating device according to claim 25, wherein
the operating construction includes a first operating member configured to be movable relative to the base member to provide the first operation, and
the first pawl is pivotally provided on the first operating member.

27. The bicycle operating device according to claim 25, wherein
the second pawl is configured to engage with the one of the ratchet teeth without transmitting movement of the operating construction to movement of the wire takeup member through the second pawl in response to the second operation.

28. The bicycle operating device according to claim 25, wherein
the second operation of the operating construction includes a first pivotal movement, and
the actuating member is configured to engage the second pawl with the one of the ratchet teeth without transmitting the first pivotal movement of the operating construction to the wire takeup member through the second pawl in response to the first pivotal movement.

29. The bicycle operating device according to claim 25, wherein
the second operation of the operating construction includes a first pivotal movement,
the actuating member is pivotable relative to the base member about a third pivot axis, and
the third pivot axis of the actuating member differs from the rotational axis of the wire takeup member to engage the second pawl with the one of the ratchet teeth without transmitting the first pivotal movement of the operating construction to the wire takeup member through the second pawl in response to the first pivotal movement.

30. The bicycle operating device according to claim 25, wherein
the first operation of the operating construction includes a pivotal movement, and
the first pawl is configured to engage with the one of the ratchet teeth to transmit the pivotal movement of the operating construction to the wire takeup member through the first pawl in the first direction in response to the pivotal movement of the operating construction.

* * * * *